(12) United States Patent
Gelmetti et al.

(10) Patent No.: US 11,174,121 B2
(45) Date of Patent: Nov. 16, 2021

(54) DEVICE FOR IMPARTING A TORSIONAL FORCE ONTO A WIRE

(71) Applicant: AWDS TECHNOLOGIES SRL, Rovereto (IT)

(72) Inventors: Carlo Gelmetti, Rovereto (IT); Filippo Corradini, Rovereto (IT)

(73) Assignee: AWDS TECHNOLOGIES SRL

( * ) Notice: Subject to any disclaimer, the term of this patent is extended or adjusted under 35 U.S.C. 154(b) by 84 days.

(21) Appl. No.: 16/747,046

(22) Filed: Jan. 20, 2020

(65) Prior Publication Data
US 2021/0221640 A1 Jul. 22, 2021

(51) Int. Cl.
*B65H 57/18* (2006.01)
*B65H 59/06* (2006.01)
*B65H 49/08* (2006.01)
*B23K 9/133* (2006.01)

(52) U.S. Cl.
CPC ........... *B65H 57/18* (2013.01); *B23K 9/1333* (2013.01); *B65H 49/08* (2013.01); *B65H 59/06* (2013.01); *B65H 2701/36* (2013.01)

(58) Field of Classification Search
CPC .... B65H 57/18; B65H 59/06; B65H 2701/36; B23K 9/1333
See application file for complete search history.

(56) References Cited

U.S. PATENT DOCUMENTS

| 318,062 | A | 5/1885 | Warren | |
| 532,565 | A | 1/1895 | Kilmer | |
| 617,353 | A | 1/1899 | Redmond | |
| 627,722 | A | 6/1899 | Edwards | |
| 932,808 | A | 8/1909 | Pelton | |
| 1,276,117 | A | 8/1918 | Riebe | 464/171 |
| 1,468,994 | A | 9/1923 | Cook | 206/393 |
| 1,508,689 | A | 9/1924 | Glasser | 219/124.03 |
| 1,640,368 | A | 8/1927 | Obetz | |
| 1,821,354 | A | 9/1931 | Meyer | 242/159 |
| 1,907,051 | A | 5/1933 | Emery | |
| 1,936,227 | A | 11/1933 | Cook | 206/59 |
| 2,027,670 | A | 1/1936 | Broeren | 312/62 |
| 2,027,674 | A | 1/1936 | Broeren | 312/60 |
| 2,059,462 | A | 11/1936 | Jungmann | |

(Continued)

FOREIGN PATENT DOCUMENTS

| CN | 1466469 | 1/2004 | ............. A61L 15/60 |
| CN | 1626423 | 6/2005 | ............. B65H 75/16 |

(Continued)

OTHER PUBLICATIONS

U.S. Appl. No. 10/596,697, filed Jun. 21, 2006.

(Continued)

*Primary Examiner* — William E Dondero
(74) *Attorney, Agent, or Firm* — Hayes Soloway P.C.

(57) ABSTRACT

A device for imparting a torsional force onto a wire has a base and a support mounted so as to be rotatable with respect to the base around an axis of rotation. The axis of rotation coincides with a wire path extending through the base and the support. Further, a wire clutching device is mounted on the support and adapted to engage at a wire guided along the wire path, and a rotation mechanism is provided which is adapted for rotating the support with respect to the base.

18 Claims, 20 Drawing Sheets

(56) References Cited

U.S. PATENT DOCUMENTS

| | | | |
|---|---|---|---|
| 2,078,161 A | 4/1937 | Rietsch | 74/297 |
| 2,329,369 A | 9/1943 | Haver | 285/11 |
| 2,366,101 A | 12/1944 | Grothey | 66/125 R |
| 2,407,746 A | 9/1946 | Johnson | |
| 2,457,910 A | 1/1949 | McLaren et al. | 74/501 |
| 2,477,059 A | 7/1949 | Hill | 242/137.1 |
| 2,483,760 A | 10/1949 | Duncan | 254/190 |
| 2,579,131 A | 12/1951 | Tinsley | 206/409 |
| 2,580,900 A | 1/1952 | Epstein | 206/409 |
| 2,679,571 A | 5/1954 | Chappel | 219/137.44 |
| 2,694,130 A | 11/1954 | Howard | 219/8 |
| 2,713,938 A | 7/1955 | Snyder | |
| 2,724,538 A | 11/1955 | Schweich | |
| 2,752,108 A | 6/1956 | Richardson | 242/128 |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,916,944 A | 12/1959 | Diesfeld | 74/472 |
| 2,929,576 A | 3/1960 | Henning | |
| 2,966,258 A | 12/1960 | Krafft | |
| 2,974,850 A | 3/1961 | Mayer | |
| 2,984,596 A | 5/1961 | Franer | 206/412 |
| 3,022,415 A | 2/1962 | Francois | 219/137.44 |
| 3,096,951 A | 7/1963 | Jenson | 242/137.1 |
| 3,108,180 A | 10/1963 | Linnander | 219/137.44 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,283,121 A | 11/1966 | Bernard et al. | 219/137.44 |
| 3,284,608 A | 11/1966 | McDonald | 219/137.43 |
| 3,344,682 A | 10/1967 | Bratz | 74/501 |
| 3,352,412 A | 11/1967 | Praying et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,536,888 A | 10/1970 | Borneman | 219/137.43 |
| 3,565,129 A | 2/1971 | Field | |
| 3,567,900 A | 3/1971 | Nelson | |
| 3,576,966 A | 5/1971 | Sullivan | |
| 3,586,222 A | 6/1971 | Rosen | 226/1 |
| 3,595,277 A | 7/1971 | Lefever | |
| 3,630,425 A | 12/1971 | Wilkens | 226/108 |
| 3,648,920 A | 3/1972 | Stump | |
| 3,672,655 A | 6/1972 | Carter | 226/108 |
| 3,675,499 A | 7/1972 | Marosy | 24/573.11 |
| 3,690,567 A | 9/1972 | Borneman | 239/591 |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,901,425 A | 8/1975 | Taylor et al. | 226/108 |
| 3,939,978 A | 2/1976 | Thomaswick | 206/454 |
| 4,000,797 A | 1/1977 | Pucanis | 193/38 |
| 4,043,331 A | 8/1977 | Martin et al. | 128/156 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,113,795 A | 9/1978 | Izawa et al. | 524/84 |
| 4,127,590 A | 11/1978 | Endo et al. | 260/346.74 |
| 4,157,436 A | 6/1979 | Endo et al. | 528/167 |
| 4,161,248 A | 7/1979 | Kalmanovitch | 206/389 |
| 4,171,783 A | 10/1979 | Waltemath | 242/128 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,280,951 A | 7/1981 | Saito et al. | 524/118 |
| 4,293,103 A | 10/1981 | Tsukamoto | |
| 4,354,487 A | 10/1982 | Oczkowski et al. | 604/366 |
| 4,392,606 A | 7/1983 | Fremion | 206/600 |
| 4,396,797 A | 8/1983 | Sakuragi et al. | 174/68 |
| 4,429,001 A | 1/1984 | Kolpin et al. | 442/340 |
| 4,451,014 A | 5/1984 | Kitt et al. | 242/128 |
| 4,464,919 A | 8/1984 | Labbe | |
| 4,500,315 A | 2/1985 | Pieniak et al. | 604/379 |
| 4,531,040 A | 7/1985 | Nawa | 219/136 |
| 4,540,225 A | 9/1985 | Johnson et al. | 439/192 |
| 4,546,631 A | 10/1985 | Singer | |
| 4,575,612 A | 3/1986 | Prunier | 219/137.43 |
| 4,581,514 A | 4/1986 | Inoue | 204/225 |
| 4,582,198 A | 4/1986 | Ditton | |
| 4,585,487 A | 4/1986 | Destree et al. | |
| 4,623,063 A | 11/1986 | Balkin | |
| 4,737,567 A | 4/1988 | Matsumoto et al. | 528/167 |
| 4,742,088 A | 5/1988 | Kim | 521/118 |
| 4,826,497 A | 5/1989 | Marcus et al. | 604/359 |
| 4,855,179 A | 8/1989 | Bourland et al. | 442/409 |
| 4,868,366 A | 9/1989 | Joseph et al. | 219/137.71 |
| 4,869,367 A | 9/1989 | Kawasaki et al. | 206/409 |
| 4,891,493 A | 1/1990 | Sato et al. | 219/137 |
| 4,916,282 A | 4/1990 | Chamming et al. | 219/69.2 |
| 4,918,286 A | 4/1990 | Boyer | 219/137.44 |
| 4,949,567 A | 8/1990 | Corbin | 72/164 |
| 4,974,789 A | 12/1990 | Milbum | 242/159 |
| 5,051,539 A | 9/1991 | Leathers-Wiessner | 174/15.7 |
| 5,061,259 A | 10/1991 | Goldman et al. | 604/368 |
| 5,078,269 A | 1/1992 | Dekko et al. | 206/397 |
| 5,100,397 A | 3/1992 | Poccia et al. | 604/365 |
| 5,105,943 A | 4/1992 | Lesko et al. | 206/397 |
| 5,109,983 A | 5/1992 | Malone et al. | 206/408 |
| 5,147,646 A | 9/1992 | Graham | 424/424 |
| 5,165,217 A | 11/1992 | Sobel et al. | 242/159 |
| 5,201,419 A | 4/1993 | Hayes | 206/409 |
| 5,205,412 A | 4/1993 | Krieg | 206/394 |
| 5,215,338 A | 6/1993 | Kimura et al. | 285/166 |
| 5,227,314 A | 7/1993 | Brown et al. | 437/10 |
| 5,261,625 A | 11/1993 | Lanoue | 242/129.8 |
| 5,277,314 A | 1/1994 | Cooper et al. | 206/398 |
| 5,314,111 A | 5/1994 | Takaku et al. | 229/110 |
| 5,368,245 A | 11/1994 | Fore | 242/171 |
| 5,372,269 A | 12/1994 | Sutton et al. | 220/62 |
| 5,452,841 A | 9/1995 | Sibata et al. | 228/180.5 |
| 5,485,968 A | 1/1996 | Fujioka | 242/172 |
| 5,494,160 A | 2/1996 | Gelmetti | 206/395 |
| 5,530,088 A | 6/1996 | Sheen et al. | 528/287 |
| 5,553,810 A | 9/1996 | Bobeczko | 242/601 |
| 5,562,646 A | 10/1996 | Goldman et al. | 604/368 |
| 5,585,013 A | 12/1996 | Truty | 219/69.12 |
| 5,586,733 A | 12/1996 | Miura et al. | 242/125.2 |
| 5,590,848 A | 1/1997 | Shore et al. | 242/361 |
| 5,629,377 A | 5/1997 | Burgert et al. | 524/832 |
| 5,665,801 A | 9/1997 | Chang et al. | 524/125 |
| 5,692,700 A | 12/1997 | Bobeczko | 242/588.2 |
| 5,714,156 A | 2/1998 | Schmidt et al. | 424/404 |
| 5,738,209 A | 4/1998 | Burr et al. | 206/397 |
| 5,739,704 A | 4/1998 | Clark | 326/62 |
| 5,746,380 A | 5/1998 | Chung | 242/171 |
| 5,758,834 A | 6/1998 | Dragoo et al. | 242/128 |
| 5,778,939 A | 7/1998 | Hok-Yin | 138/120 |
| 5,816,466 A | 10/1998 | Seufer | 226/187 |
| 5,819,934 A | 10/1998 | Cooper | 206/397 |
| 5,845,862 A | 12/1998 | Cipriani | 242/423.1 |
| 5,847,184 A | 12/1998 | Kleiner | 558/73 |
| 5,865,051 A | 2/1999 | Otzen et al. | 72/17.3 |
| 5,921,391 A | 7/1999 | Ortiz et al. | 206/397 |
| 5,931,408 A | 8/1999 | Ishii et al. | 242/580 |
| 5,932,123 A | 8/1999 | Marhofer | 219/125.11 |
| 5,971,308 A | 10/1999 | Boulton | 242/131 |
| 5,988,370 A | 11/1999 | Roemer et al. | 206/215 |
| 5,990,377 A | 11/1999 | Chen et al. | 604/381 |
| 6,016,911 A | 1/2000 | Chen | 200/395 |
| 6,019,303 A | 2/2000 | Cooper | 424/361.4 |
| 6,103,358 A | 8/2000 | Bruggermann et al. | 428/317.9 |
| 6,150,632 A | 11/2000 | Fisher | 219/137.71 |

(56) References Cited

U.S. PATENT DOCUMENTS

| | | | | |
|---|---|---|---|---|
| 6,159,591 | A | 12/2000 | Beihoffer et al. | 428/327 |
| 6,236,017 | B1 | 5/2001 | Smartt | 219/130.01 |
| 6,237,768 | B1 | 5/2001 | Cipriani | 206/408 |
| 6,245,880 | B1 | 6/2001 | Takeuchi et al. | 528/287 |
| 6,255,371 | B1 | 7/2001 | Schlosser et al. | 524/100 |
| 6,260,781 | B1 | 7/2001 | Cooper | 424/361.4 |
| 6,301,944 | B1 | 10/2001 | Offer | 72/79 |
| 6,322,016 | B1 | 11/2001 | Jacobsson et al. | 424/356.4 |
| 6,340,522 | B1 | 1/2002 | Burke et al. | 428/359 |
| 6,408,888 | B1 | 6/2002 | Baeumer et al. | 138/120 |
| 6,409,116 | B1 | 6/2002 | Brown | 242/419.1 |
| 6,417,425 | B1 | 7/2002 | Whitmore et al. | 604/367 |
| 6,425,549 | B1 | 7/2002 | Bae et al. | 242/580 |
| 6,464,077 | B1 | 10/2002 | Liu | 206/388 |
| 6,479,793 | B1 | 11/2002 | Wittmann | 219/130.5 |
| 6,481,892 | B1 | 11/2002 | Agostini | 384/43 |
| 6,498,227 | B1 | 12/2002 | Horie | 528/176 |
| 6,524,010 | B1 | 2/2003 | Derman | 384/513 |
| 6,547,176 | B1 | 4/2003 | Blain et al. | 242/423.1 |
| 6,564,943 | B2 | 5/2003 | Barton et al. | 206/395 |
| 6,613,848 | B1 | 9/2003 | Wang et al. | 525/481 |
| 6,636,776 | B1 | 10/2003 | Barton et al. | 700/169 |
| 6,648,141 | B2 | 11/2003 | Land | 206/408 |
| 6,649,870 | B1 | 11/2003 | Barton et al. | 219/137 |
| 6,708,864 | B2 | 3/2004 | Ferguson, III et al. | 228/56.3 |
| 6,715,608 | B1 | 4/2004 | Moore | 206/397 |
| 6,745,899 | B1 | 6/2004 | Barton | 206/409 |
| 6,749,139 | B2 | 6/2004 | Speck | |
| 6,750,262 | B1 | 6/2004 | Hahnle et al. | 521/64 |
| 6,753,454 | B1 | 6/2004 | Smith et al. | 602/41 |
| 6,821,454 | B2 | 11/2004 | Visca et al. | 34/41 |
| 6,831,142 | B2 | 12/2004 | Mertens et al. | 526/328.5 |
| 6,831,251 | B1 | 12/2004 | Artelsmair | B23K 9/1336 |
| 6,872,275 | B2 | 3/2005 | Ko et al. | 156/181 |
| 6,889,835 | B2 | 5/2005 | Land | 206/408 |
| 6,913,145 | B2 | 7/2005 | Barton | 206/409 |
| 6,938,767 | B2 | 9/2005 | Gelmetti | 206/408 |
| 6,977,357 | B2 | 12/2005 | Hsu et al. | 219/130.01 |
| 7,004,318 | B2 | 2/2006 | Barton | 206/409 |
| 7,108,916 | B2 | 9/2006 | Ehrnsperger et al. | 428/403 |
| 7,147,176 | B2 | 12/2006 | Rexhaj | 242/417.3 |
| 7,152,735 | B2 | 12/2006 | Dragoo et al. | 206/408 |
| 7,156,334 | B1 | 1/2007 | Fore et al. | 242/171 |
| 7,178,755 | B2 | 2/2007 | Hsu et al. | 242/423.1 |
| 7,198,152 | B2 | 4/2007 | Barton et al. | 206/409 |
| 7,220,942 | B2 | 5/2007 | Barton et al. | 219/137.7 |
| 7,301,124 | B2 | 11/2007 | Kaufman | 219/137.71 |
| 7,309,038 | B2 | 12/2007 | Carroscia | 206/409 |
| 7,377,388 | B2 | 5/2008 | Hsu et al. | 206/389 |
| RE40,351 | E | 6/2008 | Cipriani | 242/423.1 |
| 7,398,881 | B2 | 7/2008 | Barton et al. | 206/408 |
| 7,410,111 | B2 | 8/2008 | Carroscia | 242/171 |
| 7,441,657 | B2 | 10/2008 | Gelmetti | 206/393 |
| 7,441,721 | B2 | 10/2008 | Bae et al. | 242/128 |
| 7,533,906 | B2 | 5/2009 | Luettgen et al. | 285/146.1 |
| 7,563,840 | B2 | 7/2009 | Ye | 524/449 |
| 7,748,530 | B2 | 7/2010 | Hsu et al. | 206/408 |
| 7,950,523 | B2 | 5/2011 | Gelmetti | 206/408 |
| 8,207,475 | B2 | 6/2012 | Minato et al. | 219/137.31 |
| 8,225,977 | B2 | 7/2012 | Meckler | 226/1 |
| 8,235,210 | B2 | 8/2012 | De Lacerda et al. | 206/393 |
| 9,414,759 | B2 | 8/2016 | Lang | A61L 5/04087 |
| 10,350,696 | B2 | 7/2019 | Gelmetti et al. | B23K 9/12 |
| 2001/0014706 | A1 | 8/2001 | Sprenger et al. | 523/400 |
| 2001/0020663 | A1 | 9/2001 | Peterson | 242/485.7 |
| 2002/0000003 | A1 | 1/2002 | Kawasai et al. | 206/408 |
| 2002/0003014 | A1 | 1/2002 | Homma | |
| 2002/0014477 | A1 | 2/2002 | Lee et al. | |
| 2002/0039869 | A1 | 4/2002 | Achille | 442/417 |
| 2002/0108985 | A1 | 8/2002 | Garcia et al. | 226/45 |
| 2002/0120178 | A1 | 8/2002 | Tartaglia et al. | 600/114 |
| 2003/0042162 | A1 | 3/2003 | Land | 206/408 |
| 2003/0042163 | A1 | 3/2003 | Cipriant | |
| 2003/0052030 | A1 | 3/2003 | Gelmetti | 206/397 |
| 2003/0184086 | A1 | 10/2003 | Christianson | 285/146.1 |
| 2004/0004113 | A1 | 1/2004 | Blankenship | 235/375 |
| 2004/0011776 | A1 | 1/2004 | Mukai | B23K 9/1336 |
| 2004/0020041 | A1 | 2/2004 | Ferguson, III et al. | |
| 2004/0050441 | A1 | 3/2004 | Roschi | 138/120 |
| 2004/0133176 | A1 | 7/2004 | Muthiah et al. | 604/368 |
| 2004/0155090 | A1 | 8/2004 | B.-Jensen | |
| 2004/0176557 | A1 | 9/2004 | Mertens et al. | 526/328.5 |
| 2004/0186244 | A1 | 9/2004 | Hatsuda et al. | 525/451 |
| 2004/0201117 | A1 | 10/2004 | Anderson | 264/4.3 |
| 2004/0002413 | A1 | 12/2004 | Cielenski et al. | 427/421.1 |
| 2004/0265387 | A1 | 12/2004 | Hermeling et al. | 424/486 |
| 2005/0008776 | A1 | 1/2005 | Chhabra et al. | 427/180 |
| 2005/0230372 | A1 | 10/2005 | Ott | B23K 9/1087 |
| 2005/0258290 | A1 | 11/2005 | Kuper | 242/171 |
| 2005/0261461 | A1 | 11/2005 | Maeda et al. | 528/272 |
| 2006/0016792 | A1 | 1/2006 | Uecker et al. | 219/137.71 |
| 2006/0027699 | A1 | 2/2006 | Bae et al. | |
| 2006/0070987 | A1 | 4/2006 | Daniel | 219/137.71 |
| 2006/0074154 | A1 | 4/2006 | Harashina et al. | 524/115 |
| 2006/0131293 | A1 | 6/2006 | Kaufman | 219/137.71 |
| 2006/0138116 | A1 | 6/2006 | Lipnevicius | 219/137.71 |
| 2006/0155254 | A1 | 7/2006 | Sanz et al. | 604/378 |
| 2006/0207981 | A1 | 9/2006 | Diekmann | 219/137.2 |
| 2006/0247343 | A1 | 11/2006 | Kishimoto et al. | 524/117 |
| 2006/0258824 | A1 | 11/2006 | Oshima et al. | 525/533 |
| 2006/0278747 | A1 | 12/2006 | Carroscia | |
| 2007/0056943 | A1 | 3/2007 | Tenbrink | 219/130.01 |
| 2007/0080154 | A1 | 4/2007 | Ott | B23K 9/095 |
| 2007/0151964 | A1 | 7/2007 | Artelsmair et al. | 219/137.2 |
| 2007/0158324 | A1 | 7/2007 | O'Donnell | 219/137.71 |
| 2007/0175786 | A1 | 8/2007 | Nicklas | |
| 2007/0175965 | A1 | 8/2007 | Carroscia | 228/4.5 |
| 2007/0272573 | A1 | 11/2007 | Gelmetti | |
| 2007/0002843 | A1 | 12/2007 | Laymon | 219/137.51 |
| 2008/0149608 | A1 | 6/2008 | Albrecht | 219/130.1 |
| 2008/0156925 | A1 | 7/2008 | Cooper | 242/559.3 |
| 2008/0257874 | A1 | 10/2008 | Kaufman et al. | 219/137 R |
| 2008/0257875 | A1 | 10/2008 | De Keizer | 219/137.44 |
| 2008/0300349 | A1 | 12/2008 | Fuchikami et al. | 524/117 |
| 2008/0314876 | A1 | 12/2008 | Pinsonneault et al. | 219/74 |
| 2008/0314884 | A1 | 12/2008 | Fujiwara | B23K 9/0735 |
| 2009/0014572 | A1 | 1/2009 | Weissbrod et al. | |
| 2009/0014579 | A1 | 1/2009 | Bender et al. | |
| 2009/0200284 | A1 | 8/2009 | Sanchez | 219/137.51 |
| 2010/0116803 | A1 | 5/2010 | Gelmetti | 219/138 |
| 2010/0301029 | A1 | 12/2010 | Meckler | B23K 9/095 |
| 2011/0042355 | A1 | 2/2011 | Gelmetti | B23K 9/1333 |
| 2011/0073703 | A1 | 3/2011 | Gelmetti et al. | 242/615.2 |
| 2011/0094911 | A1 | 4/2011 | Gelmetti | 206/408 |
| 2011/0114523 | A1 | 5/2011 | Gelmetti | 206/407 |
| 2011/0114617 | A1 | 5/2011 | Gelmetti et al. | 219/137.9 |
| 2011/0132880 | A1 | 6/2011 | Kossowan | 219/76.14 |
| 2011/0220629 | A1 | 9/2011 | Mehn et al. | 219/136 |
| 2012/0160819 | A1 | 6/2012 | Enyedy | 219/137.71 |
| 2012/0298630 | A1 | 11/2012 | Stoutamire | 219/75 |
| 2013/0112676 | A1 | 5/2013 | Hutchison | B23K 9/09 |
| 2013/0180971 | A1 | 7/2013 | Peters et al. | 219/137.7 |
| 2013/0193124 | A1 | 8/2013 | Peters | 219/121.63 |
| 2013/0193259 | A1 | 8/2013 | Weissbrod et al. | 242/566 |
| 2013/0200055 | A1 | 8/2013 | Enyedy | 219/130.21 |
| 2014/0076872 | A1 | 3/2014 | Ott | 219/132 |

FOREIGN PATENT DOCUMENTS

| | | | | |
|---|---|---|---|---|
| CN | 202240091 | | 5/2012 | B23K 9/133 |
| DE | 1082215 | | 11/1957 | B21C 47/10 |
| DE | 1154624 | | 9/1963 | C08G 59/40 |
| DE | 2122958 | | 11/1972 | B21C 47/14 |
| DE | 2 148 348 | | 4/1973 | D01F 7/04 |
| DE | 2202177 | | 7/1973 | B65H 54/80 |
| DE | 2525938 | | 12/1976 | B23K 9/18 |
| DE | 36 09 839 | | 9/1987 | F16L 57/00 |
| DE | 19909214 | | 3/1999 | C08J 9/20 |
| DE | 199 10 128 | | 1/2001 | A61B 1/008 |
| DE | 19958697 | | 6/2001 | B01J 20/00 |
| DE | 100 06 592 | | 8/2001 | C08G 59/18 |
| DE | 10202839 | | 8/2003 | B01J 13/00 |
| DE | 103 60 466 | | 7/2005 | B23K 9/133 |
| DE | 102007015946 | | 10/2008 | B23K 9/133 |

(56) References Cited

FOREIGN PATENT DOCUMENTS

| | | | |
|---|---|---|---|
| DE | 202011104120 | 1/2012 | ............ B23K 9/133 |
| EP | 0017445 | 10/1980 | ............ B65H 59/10 |
| EP | 0408259 | 4/1992 | |
| EP | 0519424 A1 | 12/1992 | .......... B23K 9/1333 |
| EP | 0584056 | 2/1994 | ............ B65D 85/04 |
| EP | 0665 166 | 1/1995 | ............... B65D 5/44 |
| EP | 0686439 A1 | 12/1995 | ............ B21C 47/14 |
| EP | 0806429 | 11/1997 | ............. C07F 9/655 |
| EP | 1057751 A1 | 12/2000 | |
| EP | 1 275 595 | 1/2003 | ............ B65D 85/04 |
| EP | 1 295 813 | 3/2003 | ............ B65D 85/04 |
| EP | 1357059 | 10/2003 | ............ B65D 85/04 |
| EP | 1 471 024 | 10/2004 | ............ B65H 49/08 |
| EP | 1 698 421 | 6/2006 | ............ B23K 9/133 |
| EP | 1 974 846 | 10/2008 | ............ B23K 9/133 |
| EP | 2 256 064 | 1/2010 | ............ B65H 49/08 |
| EP | 2 354 039 | 1/2010 | ............ B65D 85/04 |
| EP | 2 168 706 | 3/2010 | ............ B23K 9/133 |
| EP | 2 286 950 | 2/2011 | ............ B23K 9/133 |
| EP | 2695696 | 2/2014 | .............. B23K 9/12 |
| EP | 2949416 | 12/2015 | ............ B23K 9/133 |
| FR | 1215111 | 4/1960 | ............ B21C 47/10 |
| FR | 2055181 | 5/1971 | ............ B23K 35/02 |
| FR | 2267255 | 4/1974 | |
| FR | 2595674 | 3/1988 | ............ B21C 47/14 |
| FR | 2 888 825 | 1/2007 | ............ B65H 57/14 |
| GB | 880502 | 10/1961 | ............ B21C 47/14 |
| GB | 1168928 | 10/1969 | .............. D07B 7/10 |
| GB | 1229913 | 4/1971 | ............ B21C 47/14 |
| GB | 1 575 157 | 9/1980 | ............ C09K 21/12 |
| GB | 2059462 | 4/1981 | ............... A23G 3/02 |
| GB | 2 264 482 | 9/1993 | |
| GB | 2 332 451 | 6/1999 | ............ B65H 57/18 |
| JP | 49-13065 | 2/1974 | |
| JP | 54-035842 | 3/1979 | ............... B65D 1/28 |
| JP | 54-043856 | 4/1979 | ............ B21C 47/08 |
| JP | 55-054295 | 4/1980 | ............ B23K 35/02 |
| JP | 55112176 | 8/1980 | .............. B23K 9/12 |
| JP | 55-156694 | 12/1980 | .......... B23K 35/368 |
| JP | 56-023376 | 3/1981 | ............... B23K 9/00 |
| JP | 57-102471 | 6/1982 | ............ B65H 54/82 |
| JP | 58-035068 | 3/1983 | .............. B23K 9/12 |
| JP | 58-70384 | 5/1983 | ............ B65D 85/04 |
| JP | 59-197386 | 11/1984 | ............ B23K 11/30 |
| JP | 59-229287 | 12/1984 | .............. B23K 9/12 |
| JP | 59-232669 | 12/1984 | .............. B23K 9/12 |
| JP | 60-021181 | 2/1985 | .............. B23K 9/12 |
| JP | 60-082275 | 5/1985 | .............. B23K 9/12 |
| JP | 60-082276 | 5/1985 | .............. B23K 9/12 |
| JP | 60-184422 | 9/1985 | ............ B21C 47/26 |
| JP | 60-223664 | 11/1985 | .............. B23K 9/12 |
| JP | 61-162541 A | 7/1986 | ............. C08K 5/49 |
| JP | 61-293674 | 12/1986 | .............. B23K 9/12 |
| JP | 62-009774 | 1/1987 | .............. B23K 9/12 |
| JP | 62-111872 | 5/1987 | ............ B65H 49/08 |
| JP | 62-287055 | 12/1987 | ............... C22F 1/10 |
| JP | 63-147781 | 6/1988 | ............ B65H 59/06 |
| JP | 1-65265 | 4/1989 | ............ C23C 14/56 |
| JP | 1-240222 | 9/1989 | |
| JP | 3 -264169 | 11/1991 | ............ B23K 9/133 |
| JP | 03264169 A | 11/1991 | ............ B23K 9/133 |
| JP | 4-112169 | 4/1992 | .............. B23K 9/12 |
| JP | 04-133973 | 5/1992 | ............ B65H 59/06 |
| JP | 4-274875 | 9/1992 | ............ B21C 47/04 |
| JP | H05104248 | 4/1993 | .............. B23K 9/10 |
| JP | 5-178538 | 7/1993 | ............ B65H 59/06 |
| JP | 7-247058 | 9/1995 | ............ B21C 47/24 |
| JP | 8-40642 | 2/1996 | ............ B21C 47/28 |
| JP | 08-150492 | 6/1996 | ............ B23K 35/02 |
| JP | 08-267274 | 10/1996 | ............ B23K 35/30 |
| JP | 2000-202630 | 7/2000 | ............ B23K 9/133 |
| JP | 2000-225468 | 8/2000 | .............. B23K 9/12 |
| JP | 2000-263239 | 9/2000 | ............ B23K 11/00 |
| JP | 2001-26375 | 1/2001 | ............ B65H 75/16 |
| JP | 2001-150187 | 6/2001 | ................ B21D 3/06 |
| JP | 2001-323268 A | 11/2001 | ............ C07F 9/6574 |
| JP | 2004-025242 | 1/2004 | ............ B23K 35/20 |
| JP | 2004-025243 | 1/2004 | .............. B23K 9/12 |
| JP | 2005-169499 | 6/2005 | ............ B23K 9/133 |
| JP | 2007-927 | 1/2007 | ............ B23K 9/133 |
| JP | 2007-29971 | 2/2007 | ............ B23K 9/133 |
| KR | 2002-0077857 | 10/2002 | ............ B65D 85/04 |
| KR | 20080013519 | 2/2008 | |
| KR | 20080013519 A * | 2/2008 | |
| RU | 793678 | 1/1981 | ............ B21C 47/02 |
| RU | 1412830 | 7/1988 | ............ B21C 47/02 |
| WO | WO 81/03319 | 11/1981 | ............ B65D 25/52 |
| WO | WO 8810230 | 12/1988 | ............ B65H 49/08 |
| WO | WO 94-00493 | 1/1994 | ............. A61K 39/00 |
| WO | WO 94-19258 | 9/1994 | ................ B65D 5/10 |
| WO | WO 97/00878 | 1/1997 | ............. C07F 9/6571 |
| WO | WO 98/52844 | 11/1998 | ............ B65D 85/04 |
| WO | WO 00-50197 | 8/2000 | ............ B23C 19/00 |
| WO | WO 01/27365 | 4/2001 | ............... D01H 4/28 |
| WO | WO 02/094493 | 11/2002 | |
| WO | WO 03-106096 A1 | 12/2003 | ............ B21C 47/20 |
| WO | WO 2005/005704 | 1/2005 | ............ D04H 13/02 |
| WO | WO2005042201 | 5/2005 | ............ B23K 9/133 |
| WO | WO 2005/061168 | 7/2005 | |
| WO | 2006091075 | 8/2006 | ............ B23K 9/133 |
| WO | WO 2007/010171 | 1/2007 | ............ B65H 57/00 |
| WO | WO 2007/112972 | 10/2007 | ............ B23K 9/133 |
| WO | WO 2007/149689 | 12/2007 | ............ B65H 57/18 |
| WO | WO 2009/007845 | 1/2009 | ............ B23K 9/133 |
| WO | WO2009027784 | 3/2009 | ............ B23K 9/133 |
| WO | WO 2009/143917 | 12/2009 | ............ B65H 57/14 |
| WO | WO 2011/147565 | 12/2011 | ............ B23K 9/133 |
| WO | WO 2013/092658 | 6/2013 | ............ B65H 57/18 |
| WO | WO2016022389 | 2/2016 | ............ B65H 49/08 |

OTHER PUBLICATIONS

U.S. Appl. No. 11/466,048, filed Aug. 21, 2006.
U.S. Appl. No. 12/545,717, filed Aug. 21, 2009.
U.S. Appl. No. 12/545,720, filed Aug. 21, 2009.
U.S. Appl. No. 12/593,271, filed Sep. 25, 2009.
U.S. Appl. No. 12/572,994, filed Oct. 2, 2009.
U.S. Appl. No. 12/618,165, filed Nov. 13, 2009.
U.S. Appl. No. 12/618,250, filed Nov. 13, 2009.
U.S. Appl. No. 12/691,554, filed Jan. 21, 2010.
U.S. Appl. No. 12/789,095, filed May 27, 2010.
U.S. Appl. No. 12/994,686, filed Nov. 24, 2010.
U.S. Appl. No. 13/330,314, filed Dec. 19, 2011.
U.S. Appl. No. 13/382,491, filed Jan. 5, 2012.
U.S. Appl. No. 13/744,394, filed Jan. 17, 2013.
U.S. Appl. No. 13/912,016, filed Jun. 6, 2013.
U.S. Appl. No. 14/030,879, filed Sep. 18, 2013.
U.S. Appl. No. 14/195,497, filed Mar. 3, 2014.
U.S. Appl. No. 14/289,090, filed May 28, 2014.
U.S. Appl. No. 14/481,722, filed Sep. 9, 2014.
U.S. Appl. No. 14/679,768, filed Apr. 6, 2015.
U.S. Appl. No. 14/850,753, filed Sep. 10, 2015.
U.S. Appl. No. 15/295,797, filed Oct. 17, 2016.
U.S. Appl. No. 16/921,387, filed Jul. 6, 2020.
U.S. Appl. No. 14/289,090, filed May 28, 2014 Gelmetti et al.
U.S. Appl. No. 14/679,768, filed Apr. 6, 2015 Gelmetti et al.
U.S. Appl. No. 16/921,387, filed Jul. 6, 2020 Gelmetti et al.
"International Plastics Flammability Handbook" Jurgen Troitzsch, $2^{nd}$ edition, 1990, pp. 33, 43-49 and 59 (11 pgs).
Chinese Official Action, application No. 200580051604.8, dated Mar. 17, 2010 (10 pgs).
EPO Office Action issued for related application No. 09753572.8, dated May 2, 2012 (7 pgs).
European Office Action for corresponding application No. 10 014 533.1-2302, dated Apr. 3, 2012 (4 pgs).
European Office Action issued for 09777298.2, dated Aug. 31, 2012 (4 pgs).
European Office Action issued application No. 16180212.9, dated Jan. 19, 2017 (7 pgs).

(56) References Cited

OTHER PUBLICATIONS

European Search Report issued in application No. 16160312.1, dated Sep. 19, 2016 (7 pgs).
European Search Report, application No. 07014170.1, dated Sep. 17, 2008 (10 pgs).
Extended European Search Report issued in application No. 15168866.0, dated Dec. 22, 2015 (6 pgs).
Extended European Search Report issued in related application No. 13179908.2, dated Nov. 13, 2013 (6 pgs).
Hansen et al., "Water Absorption and Mechanical Properties of Electrospun Structured Hydrogels", Journal of Applied Polymer Science, vol. 95, pp. 427-434 (2005) (8 pgs).
International Preliminary Report on Patentability issued for related application No. PCT/EP2009/001285, dated Nov. 30, 2010 (6 pgs).
International Preliminary Report on Patentability, dated Sep. 16, 2010 (5 pgs).
International Preliminary Report, PCT/IPEA/409, dated Dec. 23, 2005, 7 pages.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Italian Search Report issued in related application No. MI20121423, dated Apr. 29, 2013 (2 pgs).
Korean Official Action dated May 16, 2011, Appln. No. 2008-7005433, (3 pgs).
Notice of Allowance dated Mar. 18, 2013 issued in U.S. Appl. No. 12/994,686 (10 pgs).
Notice of Allowance dated Mar. 5, 2013 issued in U.S. Appl. No. 12/593,271 (15 pgs).
Notice of Allowance issued in U.S. Appl. No. 14/481,722, dated May 4, 2018 (19 pgs).
Notice of Allowance issued in U.S. Appl. No. 14/850,753, dated Jan. 19, 2018 (14 pgs).
Notice of Allowance issued in U.S. Appl. No. 14/850,753, dated Mar. 27, 2018 (14 pgs).
Notice of Allowance issued in related U.S. Appl. No. 12/917,320 dated Jun. 18, 2012 (25 pgs).
Office Action issued for related U.S. Appl. No. 12/618,250, dated Apr. 26, 2012 (11 pgs).
Office Action issued in U.S. Appl. No. 13/912,016, dated Apr. 21, 2017 (25 pgs).
Office Action issued in U.S. Appl. No. 14/195,497, dated Feb. 23, 2018 (30 pgs).
Office Action issued in U.S. Appl. No. 14/195,497, dated Mar. 23, 2017 (24 pgs).
Office Action issued in U.S. Appl. No. 14/195,497, dated May 19, 2016 (35 pgs).
Office Action issued in U.S. Appl. No. 14/195,497, dated Sep. 9, 2016 (21 pgs).
Office Action issued in U.S. Appl. No. 14/195,497, dated Sep. 7, 2017 (29 pgs).
Office Action issued in U.S. Appl. No. 14/289,090, dated Aug. 4, 2016 (10 pgs).
Office Action issued in U.S. Appl. No. 14/289,090, dated Dec. 17, 2018 (11 pgs).
Office Action issued in U.S. Appl. No. 14/289,090, dated Jan. 4, 2018 (18 pgs).
Office Action issued in U.S. Appl. No. 14/289,090, dated Mar. 17, 2016 (30 pgs).
Office Action issued in U.S. Appl. No. 14/289,090, dated Nov. 6, 2017 (6 pgs).
Office Action issued in U.S. Appl. No. 14/289,090, dated Sep. 18, 2017 (27 pgs).
Office Action issued in U.S. Appl. No. 14/289,090. dated Jul. 10, 2018 (30 pgs).
Office Action issued in U.S. Appl. No. 14/481,722, dated Dec. 12, 2017 (16 pgs).
Office Action issued in U.S. Appl. No. 14/481,722, dated Jan. 26, 2017 (16 pgs).
Office Action issued in U.S. Appl. No. 14/481,722, dated Jul. 17, 2017 (23 pgs).
Office Action issued in U.S. Appl. No. 14/481,722, dated Jun. 14, 2016 (25 pgs).
Office Action issued in U.S. Appl. No. 14/481,722, dated Nov. 4, 2016 (18 pgs).
Office Action issued in U.S. Appl. No. 14/679,768, dated Jan. 30, 2017 (57 pgs).
Office Action issued in U.S. Appl. No. 14/679,768, dated Jan. 12, 2018 (26 pgs).
Office Action issued in U.S. Appl. No. 14/679,768, dated Jan. 24, 2019 (20 pgs).
Office Action issued in U.S. Appl. No. 14/850,753, dated Aug. 25, 2017 (64 pgs).
Office Action issued in related U.S. Appl. No. 12/572,994 dated Nov. 25, 2011 (11 pgs).
Office Action issued in related U.S. Appl. No. 12/572,994 dated Aug. 12, 2011 (13pgs).
Office Action issued in related U.S. Appl. No. 12/572,994, dated Apr. 24, 2013 (22 pgs).
Office Action issued in related U.S. Appl. No. 12/593,271 dated Aug. 31, 2012 (7pgs).
Office Action issued in related U.S. Appl. No. 12/789,095 dated Jun. 12, 2012 (8pgs).
Office Action issued in related U.S. Appl. No. 13/330,314, dated Feb. 28, 2014 (10 pgs).
Office Action issued in related U.S. Appl. No. 13/382,491, dated Jul. 11, 2013 (15 pgs).
OfficeAction issued in U.S. Appl. No. 14/289,090, dated Feb. 13, 2017 (21 pgs).
PCT International Search Report, dated Nov. 6, 2008 (18 pgs).
Plaza et al., Preparation of ethylenebis(nitrilodimethylene)tetrakis(phenylphosphinic acid), Inorganic Synthesis, vol. 16, No. 199, abstract, one page.
Search Report received in Applicant's counterpart European Patent Application U.S. Appl. No. 08017572.2-2302, dated Mar. 13, 2009 (5 pgs).
Search Report received in Applicant's counterpart European Patent Application Serial No. 10014216.5-1256, dated Apr. 14, 2011 (8 pgs).
Search Report received in Applicant's counterpart European Patent Application Serial No. 11000892.7-2302, dated Jul. 19, 2011 (8 pgs).
Search Report received in Applicant's counterpart European Patent Application Serial No. 11000236.7, dated Aug. 4, 2011 (8 pgs).
U.S. Office Action issued in related U.S. Appl. No. 12/572,994, dated Sep. 17, 2013 (13 pgs).
Ullmanns Encyclopedia of Industrial Chemistry, Sulfuric Acid & Sulfur Trioxide to Tetrahydrofuran, Superabsorbents, 6$^{th}$ Edition, vol. 35, pp. 73, 80, 86 and 89 (2003) (5 pgs).
U.S. Official Action dated Dec. 14, 2012, issued in U.S. Appl. No. 12/994,686 (17 pgs).
U.S. Official Action dated Feb. 13, 2012, issued in U.S. Appl. No. 12/917,320 (13 pgs).
U.S. Official Action dated Mar. 5, 2013 issued in U.S. Appl. No. 13/382,491 (33 pgs).
European Search Report, application No. 10014553.1, dated Mar. 2, 2011 (7 pgs).
Office Action issued in U.S. Appl. No. 14/679,768, dated Aug. 2, 2017 (33 pgs).
Office Action issued in U.S. Appl. No. 16/921,387, dated Sep. 9, 2021 (22 pgs).
European Search reported issued in application EP21152057, dated Jul. 2, 2021 (6 pgs).

* cited by examiner

DEVICE FOR IMPARTING A TORSIONAL FORCE ONTO A WIRE

The invention relates to a device for imparting a torsional force onto a wire which can be a welding wire.

BACKGROUND OF THE INVENTION

Wires consumables are used in many industrial applications: from surface treatments like metallization to joining of metal parts in welding. In the coming years, wires will be increasingly utilized in the very important and continuously improving field of 3D printers.

In many industrial applications, which are nowadays seeing important investments in automatic and robotic systems, a maximized productivity is essential and bulk containers with large quantities of consumable are preferred to smaller spools because they allow to reduce the interruptions and minimize the spool replacement downtime. A parameter commonly accepted in the welding industry to measure the changeover downtime teaches that it normally takes an average of 15 minutes to replace an empty 15 kg spool with a full new one, and the spool changeover downtime can be therefore quantified in one minute lost to changeover for one kg of wire. Based on this calculation, it appears obvious that a large pack or drum containing 1200 Kgs of product is equivalent to as much as 20 hours of changeover downtime saving. These 20 hours can be better used to actively produce instead of having to continuously interrupt the production because of spool changes: this advantage translates into a significant reduction of production costs and improves the efficiency of the manufacturing processes.

It must be added that every undesired production stop can lead to additional complications and disadvantages in terms of consistency of quality, because in certain welding processes like the production of fuel tanks or long welds on trailers or railway cars, it is generally not acceptable to stop in the middle of a weld bead, which must instead preferably be uninterrupted from start-to-end of the welding process; in certain metallization or welding applications, an intermediate unwanted interruption can cause a total rejection and scrapping of the part altogether.

The concentration of packs containing large quantities of wire consumable in specific centralized areas (called "wire farms"), at a safe distance from dangerous sparks generated by the welding arc and where handling by forklifts is facilitated, is now made possible by the wire feed systems available in the marketplace which can help transport the wires smoothly and without friction through conduits with rolls over distances that can reach the 100 meters from the packs location to the welding or metallizing torch where the wire consumable is actually melted or fused. Being able to position large packs in a safe centralized area, besides reducing the risks connected to their handling and transport and the welding sparks fire hazard, also allows an easier inspection without having to enter the production cell perimeter and eventually negatively interfere with the production cycles.

Bulk packs containing a large quantity of wire, which allow to produce continuously without interruptions, represent an essential requirement of highly productive wire farms setups.

Supports carrying wires are available in different formats: from small spools carrying as little as 0.5 kgs to bulk containers carrying up to 2 tons of product.

There are several ways to store a large quantity of wire consumable either on or inside a bulk container: from large spools which require some rotating de-reeling equipment, to reel capstans which must be placed on turntables to be emptied of their content. In both cases however, the wire is exposed to possible contamination, which can lead to rust and weld porosity and any rotational equipment which has to be utilized to unwind large wire spools or reels, takes precious and sometimes badly needed floor space.

A third and definitely more effective system was developed several years ago: a winding machine which plastically deforms the wire by straightening, stretching and turning it to impart a counter-torsion and subsequently lay it into a container in the shape of a horizontal coil. When the wire is paid out for consumption, it can easily and smoothly be extracted without any major feeding difficulty from its stationary container without need of turntables or de-reeling devices and, if the winding process has been done correctly, it should not tangle prior to exiting the pack. This process is called "twist-free" winding but it is not an easy one and sometimes, depending on the hardness, columnar strength, grade and chemistry, the wire can still retain some tension, which must be controlled during the extraction through a retainer plate of varying weight and shape, normally placed on the wire coil to ensure that only one strand at a time is being extracted from the container. If accidentally more loops feed out during the extraction process, the immediate consequence will be a tangle and a production interruption.

The prior art teaches of many inventions focused on developing or improving all sorts of systems to retain and brake the wire during pay out: from plates of various shapes to spherical marbles dropped freely on the wire or retaining devices with a rotating wire guiding arm and ribbing underneath the plate to ensure that only one strand is being pulled out and not more loops at the same time; the problem is that if the wire being paid out from the pack is charged with too much tension, it inevitably drags some wire loops toward the central plate opening, where they can fall and tangle if they have moved during the transport, regardless of the type of retainer used. The first reaction is always to increase the retaining weight, in order to keep the wire in check, but if retainer plates are too heavy they will inevitably deform the wires, and deformed wires can cause arc wandering issues and consequent weld quality problems and even very heavy retainers cannot always keep the wire controlled.

Among the many prior art patents describing various wire retaining systems for aluminum and all steel wires in general:

U.S. Pat. No. 5,746,380 describes a layer of spherical elements on the wire coil to control the wire pay-out.

WO 2016/022389 suggests a combination of a retainer plate with ribs and a wire guiding rotating arm, with the rotating arm having the scope to keep the wire constrained and limiting its range of movement, while guiding it towards the outside.

U.S. Pat. No. 7,410,111 teaches of a retainer plate with openings to make it lighter and prevent aluminium wire deformation.

U.S. Pat. No. 7,950,523 describes a combination of two plates interacting to control the wire strands in case they have been misplaced during transport and handling.

All of the formerly proposed solutions can become ineffective in presence of a wire excessively loaded with tension, because it can find a way to slip out uncontrolled from underneath the retainer plate and fall into the pack centre where eventually it tangles.

The equipment efficiency combined with the operator's skills and with a reliable wire retainer plate can truly make a difference in minimizing the residual tension left on the wire by the twist-free winding and ensuring a smooth wire feeding, but at the time of extracting the wire some other variables can intervene and negatively affect the wire performance: a bad adjustment of the wire feeder pressure rolls or worn out pressure rolls guiding grooves or "U" shaped as opposed to "V" shaped guiding grooves and vice-versa or, even worse, incorrect size grooves not matching the diameter of the wire in use. All of the above can contribute to charge a twist-free wound wire with tension, while it is being pulled from its container and as soon as the tension accumulation exceeds the braking effect exerted by the retainer plate, the wire springs out unchecked and eventually tangles and jams inside the pack, either in one single knot or in the form of an uncontrolled messy bundle of loops, thus causing the production interruption that the large bulk pack was designed to avoid in the first place.

The problem of the residual tension still present on the wire after the twist-free winding process, seems to be worse with 5000 grade aluminum wires, but it can affect all aluminum wires and those harder steel wires which are more resistant to deformation. The behavior of the 5000 grade aluminum wires is quite unpredictable, and it is probably linked to the chemistry of the wire itself or their hardness, which can vary depending on the annealing process which they undergo during their production. It has been noted that the 5000 grades aluminum welding wires have a tendency to partially revert back to their pre-torsion condition after having remained stored inside their bulk packs for a given period of time and the smaller is the container diameter the worse seems to be this type of "static" deformation.

In summary, even after the twist-free winding machine had done its job of correctly laying the torsion less wire inside the pack, other negative variables (equipment defects, an incorrect adjustment, adjustment to the container shape, etc.) can still negatively impact the wire performance, notwithstanding the skills and the special care used by the operator when adjusting the winding machine.

Scope of the invention is to intervene on the wire at some point between the coil and the wire feeder, by offsetting and neutralizing its residual tension to the point that even the payout controlling retainer plate might not be necessary or at least a very light and flexible retainer plate can be used instead.

BRIEF DESCRIPTION OF THE INVENTION

The invention is designed to ensure a smooth and trouble-free wire payout from bulk packs, especially with aluminum welding wires but it is applicable to all wires in general after they have been deposited into the bulk packs with the twist-free winding process.

Generally speaking, it consists of a counter-tension rotating device which can be positioned anywhere between the wire coil and the wire feeder. In a preferred embodiment and in order to maximize its effectiveness, the device is mounted on top of the dome, right at the point where the wire exits the pack.

The device is equipped with at least one but preferably two (or more) wheels whose guiding grooves lock onto the wire and impart on it a counter-torsional movement by making it rotate on its axis in a given direction (clockwise or anti-clockwise), which is preferably the unwinding direction of the wire itself. This counter twist neutralizes whatever tension is still present on the wire regardless whether it is a consequence of an incorrect twist-free winding process or because of the excessive tension accumulated on the wire by a bad wheel pressure adjustment or by defective/worn out feeder roll grooves.

Additionally, the counter torsional force exerted on the wire conveniently maintains the wire pushed toward the external edge of the wire coil, thus preventing wire loops from falling uncontrolled into the open free space at the center of the bulk pack, even after they have been inadvertently displaced during handling or transport.

The rotation of the tension-relief device can be activated in two ways:

(1) by the mechanical combined action of two or more wheels connected to a rotating washer base and interacting with it through a bevel gear. With this embodiment a group of one or more grooved wheels (preferably two) are pushed against the wire being pulled by the feeder and in turn, thanks to their bevel gear, they engage and rotate a round geared washer base: while turning they "clutch" or grip the wire and impart on it a counter twisting force in the predetermined desired direction, with the rotation speed and its direction depending on the shape and orientation of the bevel gear.

(2) by an electrical motor which automatically determines the direction of the twist along the wire axis while the wire is being paid out. In this case the motor speed and the rotation of the wire is controlled by an external PLC which can be embedded in the wire feeder (as in the preferred embodiment) or placed outside the wire feeder.

With the mechanical embodiment the tension relieving rotating speed cannot be subsequently adjusted or paused, while the tension-relief device operated by a motor (which can be of any known type, like DC, AC, Brushless or Stepper) is definitely preferable and more flexible because it can be programmed through the PLC to automatically perform several important functions. It is possible to adapt the direction of rotation imparted onto the wire to the winding direction of the wire. Further, the control can determine when an excessive counter-tension force has accumulated on the wire and consequently activate or pause the rotation of the washer and grooved wheels through an electromagnet which engages or disengages the motor, as necessary.

The motor engagement can be activated also with a pneumatic or magnetic piston which pushes the mobile part of the device which carries the motor against the rotating washer carrying the group of grooved wheels which contribute to impart the counter-torsion effect onto the feeding wire. While in this case the motor rotates continuously and it only engages the rotation washer when it needs to impart the counter twist to offset the accumulating tension on the wire, the motor can also engage continuously the rotation washer through a belt or bevel gears, and in this case its function has to be controlled and programmed through the external PLC.

Generally speaking, the neutralization of the tension generated by the counter-twisting of wire along its axis, either in the clockwise or anti-clockwise direction as necessary, can actively contribute to a smooth wire payout even without the use of a retainer plate; or, if the preference goes to the employment of a retainer plate, it can at least be a very light and flexible one, and this can definitely be beneficial to prevent a possible deformation of softer aluminum wires.

In a preferred embodiment the retainer plate can still be placed on the wire coil and tied to the wire during handling and transportation, but it can be easily split in two or more sections for the purpose of being easily removed even with the wire already inserted into the guiding conduit.

The invention provides a device for imparting a torsional force onto a wire, having a base, a support mounted so as to be rotatable with respect to the base around an axis of rotation, the axis of rotation coinciding with a wire path extending through the base and the support, a wire clutching device mounted on the support and adapted to engage at a wire guided along the wire path, and a rotation mechanism which is adapted for rotating the support with respect to the base. The wire clutching device mechanically engages the wire such that it can exert a torsional force onto the wire to the desired extent.

The wire clutching device can be implemented in any form which allows wire pay out (meaning: a translational movement of the wire along the wire path) and at the same time imparting a rotational movement onto the wire. Preferably, the wire clutching device is a pair of rolls which are mounted on the support, the rolls being arranged on opposite sides of the wire path, at least one of the rolls having a wire reception groove. A pair of rolls is a very simple and yet effective means for mechanically engaging at the wire so as to rotate it around its axis while at the same time allowing wire pay out.

In order to ensure that different wires can be reliably rotated around its axis, a biasing device is provided for biasing the two rolls against each other, allowing to adapt the clutching force to the particular requirements.

The rotation mechanism can comprise a gear adapted for converting a movement of the wire along the wire path into a rotation of the support with respect to the base, thereby avoiding the need for a separate drive for rotating the wire clutching mechanism.

The gear can be a bevel gear with a ring gear connected to the base and a pinion mounted rotatably on the support, resulting in a compact rotation mechanism.

As an alternative to a bevel gear, a worm drive can be used which is very compact.

In order to allow for a change of the direction in which the wire clutching device is being rotated when wire is being pulled through the wheels of the wire clutching device, two mounting positions for the pinion are provided on the support.

With a torque limiter associated with the rotation mechanism, the maximum amount of torsional force can very easily be limited to a desired threshold.

In an alternative design, the rotation mechanism can comprise a drive motor mounted on the base and adapted for rotating the support with respect to the base. The drive motor can be operated independently from the speed with which the wire is drawn through the wire clutching device, thus allowing to control the torsional force applied to the wire independently from the wire withdrawal speed.

A coupling device can be provided for connecting the motor to the support, allowing to disengage and engage the motor when appropriate.

In one technically simple yet reliable design, the coupling comprises an application device for urging a drive wheel connected to the drive motor, against a driven surface associated with the support.

The device for applying a torsional force onto the wire can comprise a motor current sensor for detecting when excessive torsional forces are imparted onto the wire. The motor current is namely a good indication of the applied torsional force.

The invention also provides a system with a container in which an amount of wire is contained in the form of a coil consisting of a plurality of loops of wire, a device for imparting a torsional force onto a wire, the device being mounted above the wire, the device having a base, a support mounted so as to be rotatable with respect to the base around an axis of rotation, the axis of rotation coinciding with a wire path extending through the base and the support, a pair of rolls which are mounted on the support, the rolls being arranged on opposite sides of the wire path, at least one of the rolls having a wire reception groove, and a rotation mechanism which is adapted for rotating the support with respect to the base, the system further comprising at least one wire feeder which is arranged downstream of the device for imparting a torsional force onto the wire. The device for imparting a torsional force onto the wire is conveniently controlled directly from the control of the wire feeder.

Preferably, two wire feeders are being used, namely an auxiliary wire feeder which is arranged downstream of the device for imparting a rotation onto the wire, and a main wire feeder which is provided downstream of the auxiliary wire feeder and in a significant distance therefrom. Using two wire feeders allows arranging the wire container in a significant distance from the place where the wire is being consumed.

In a preferred embodiment, the wire is a welding wire made from an aluminum alloy comprising magnesium. Field test have shown that his type of welding wire has a tendency internal stress when being stored for some time. Accordingly, the effect of the device for imparting a torsional force onto the welding wire is very beneficial.

BRIEF DESCRIPTION OF THE DRAWINGS

In the drawings,

In FIG. 1, a container 1 is shown in which a large quantity of wire 2 is contained in the form of a coil 3. Coil 3 consists of a plurality of loops formed from the wire 2.

Wire 2 can be a welding wire. It can also be any consumable wire which is used for 3D printing, for metallization, etc.

Wire 2 is withdrawn from container 1 through an upper opening of the container. A cover or a dome 4 can be placed on top of the container 1, with the main purpose of dome 4 being to prevent contamination of the interior of container 1 during the time period when the wire is being consumed.

In order to prevent loops of wire from falling into the interior of coil 3, a retainer 5 is placed on the upper surface of coil 3. The main purpose of retainer 5 is to exert a braking force onto the wire and to create friction with its weight.

Figure 1:
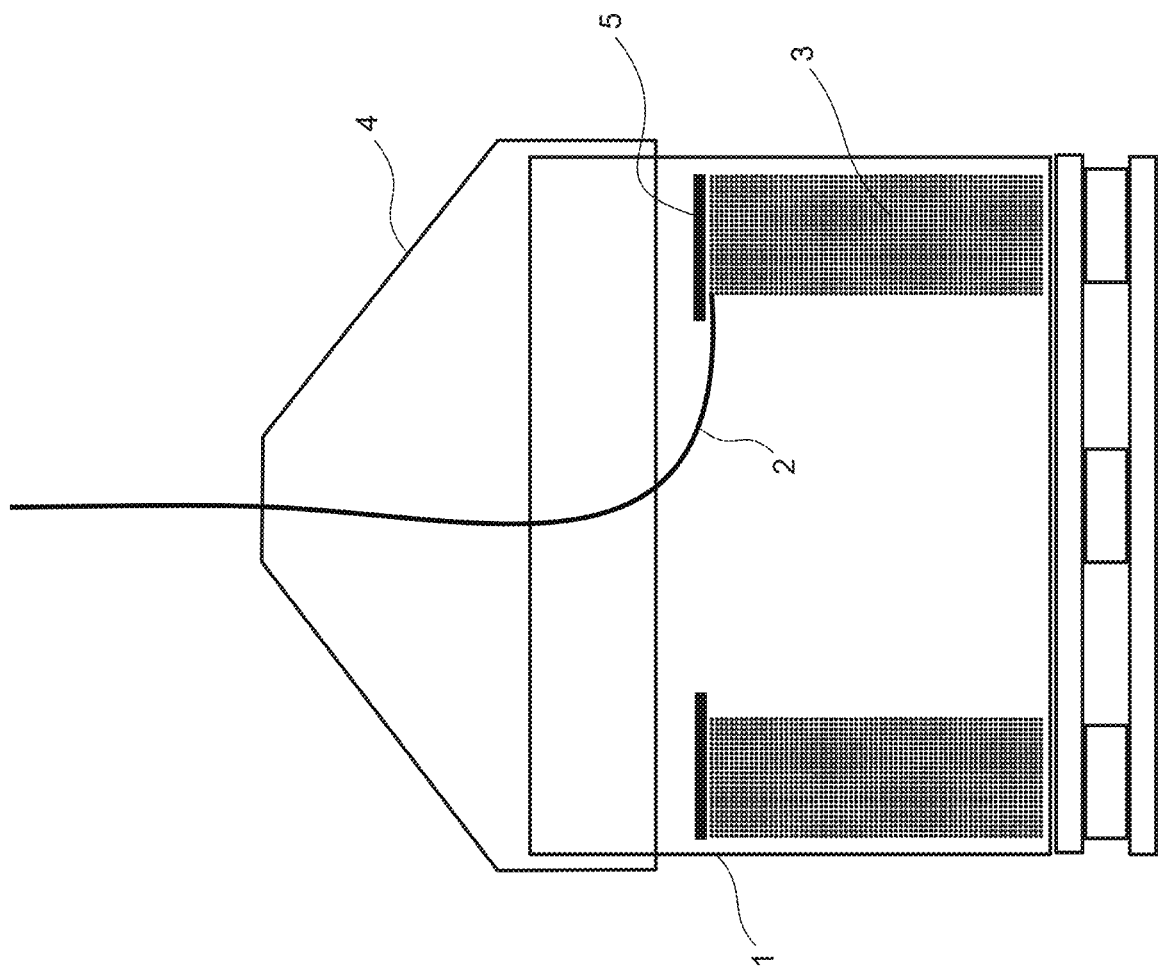
FIG. 1 shows a cross section of a container containing a wire coil.
Figure 2:
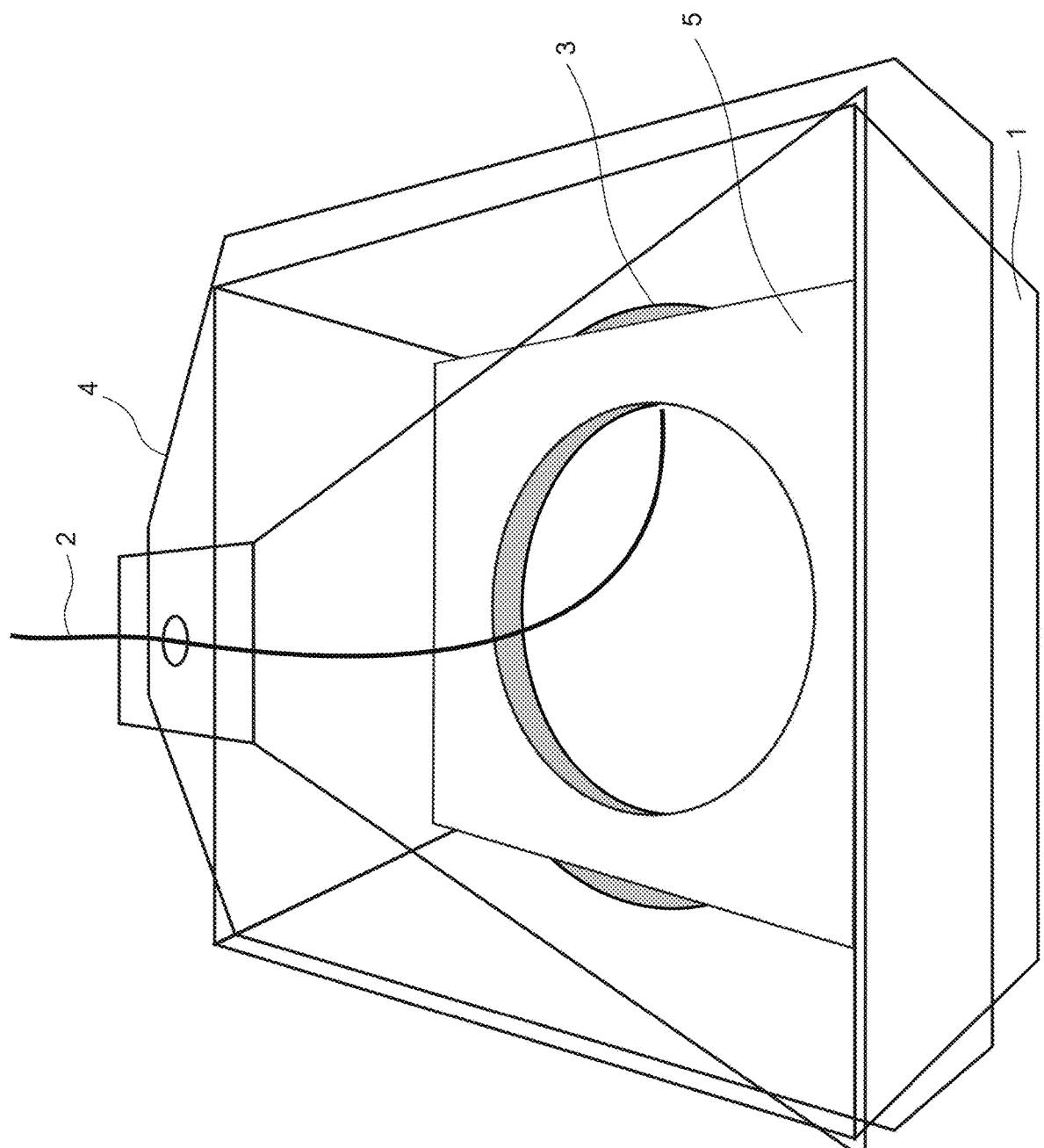
FIG. 2 shows a perspective view of the container of FIG. 1.
Figure 3:
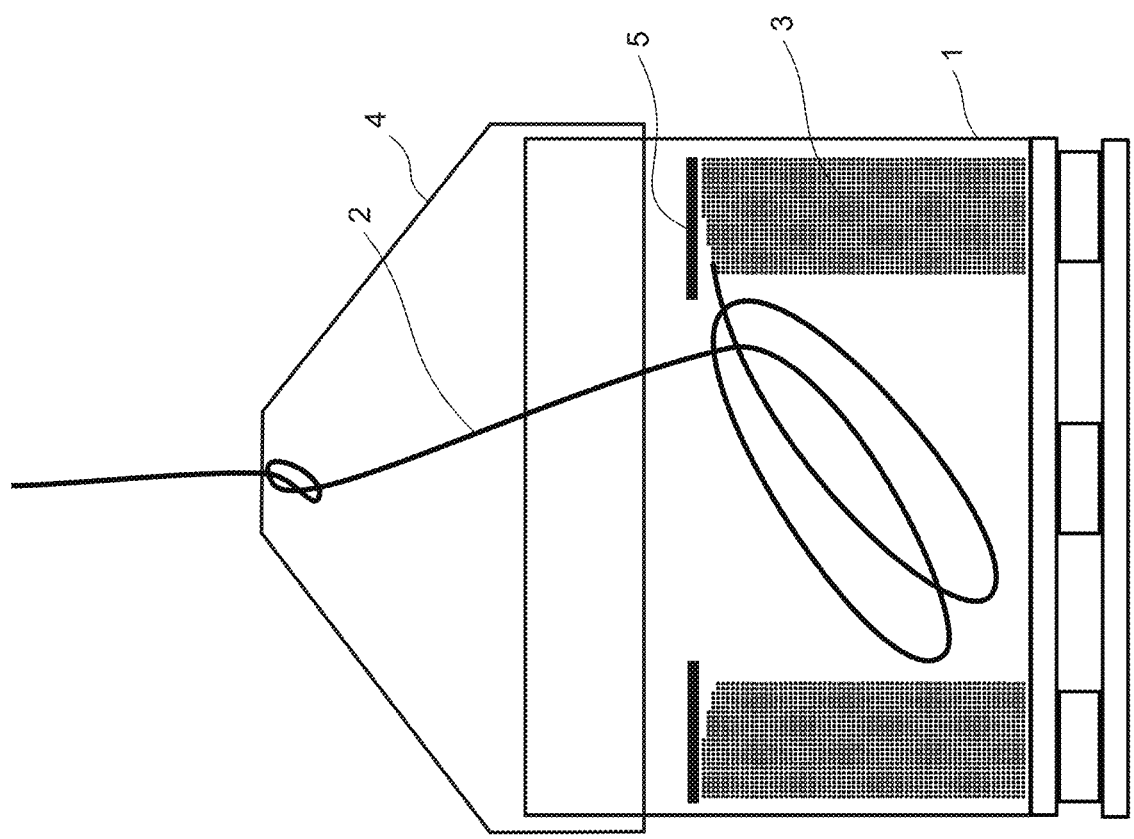
FIG. 3 shows the container of FIG. 1 with entangled wires.

As can be seen in FIG. 3, it might occur that some loops of the wire fall into the interior of coil 3 despite the presence of the retainer. Should the loops entangle, the wire can no longer be withdrawn from container 1.

Figure 4:
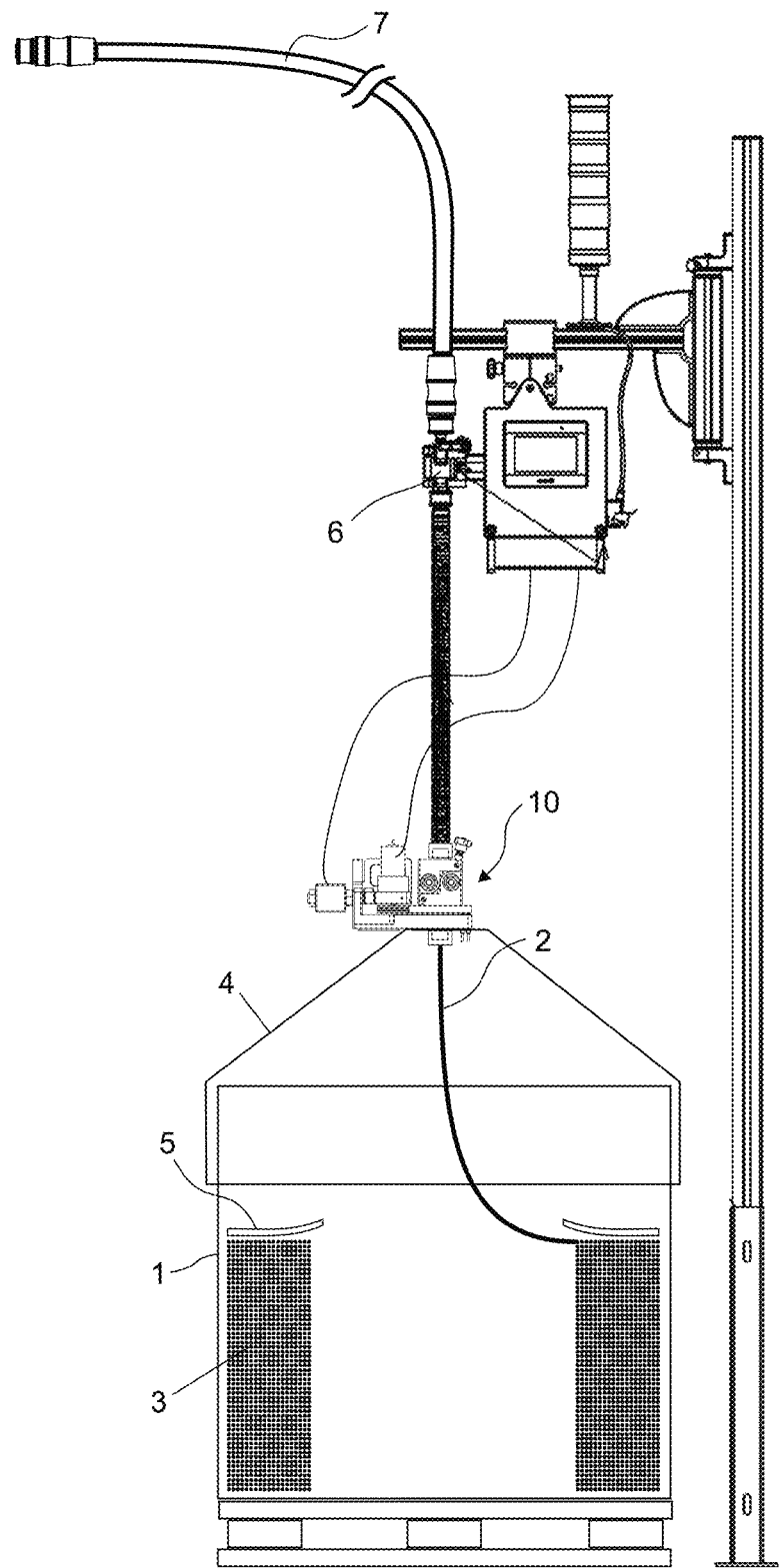
FIG. 4 shows a system according to the invention in a side view.

FIG. 4 shows a system according to the invention, which prevents loops from falling into the interior of coil 3 and from becoming entangled.

An important element of the invention is a device 10 for imparting a torsional force onto the wire 2. Generally speaking, device 10 rotates the wire around its own axis, thereby offsetting some of the residual stress in the wire and also ensuring that the loops of wire remain in their position within container 1.

Downstream of device 10, a wire feeder 6 can be arranged which advances the wire into a wire guide 7 and towards the place where the wire is being consumed, for example to a welding robot. A main wire feeder can be used close to the welding robot so that wire feeder 6 is an auxiliary wire feeder.

Figure 5:
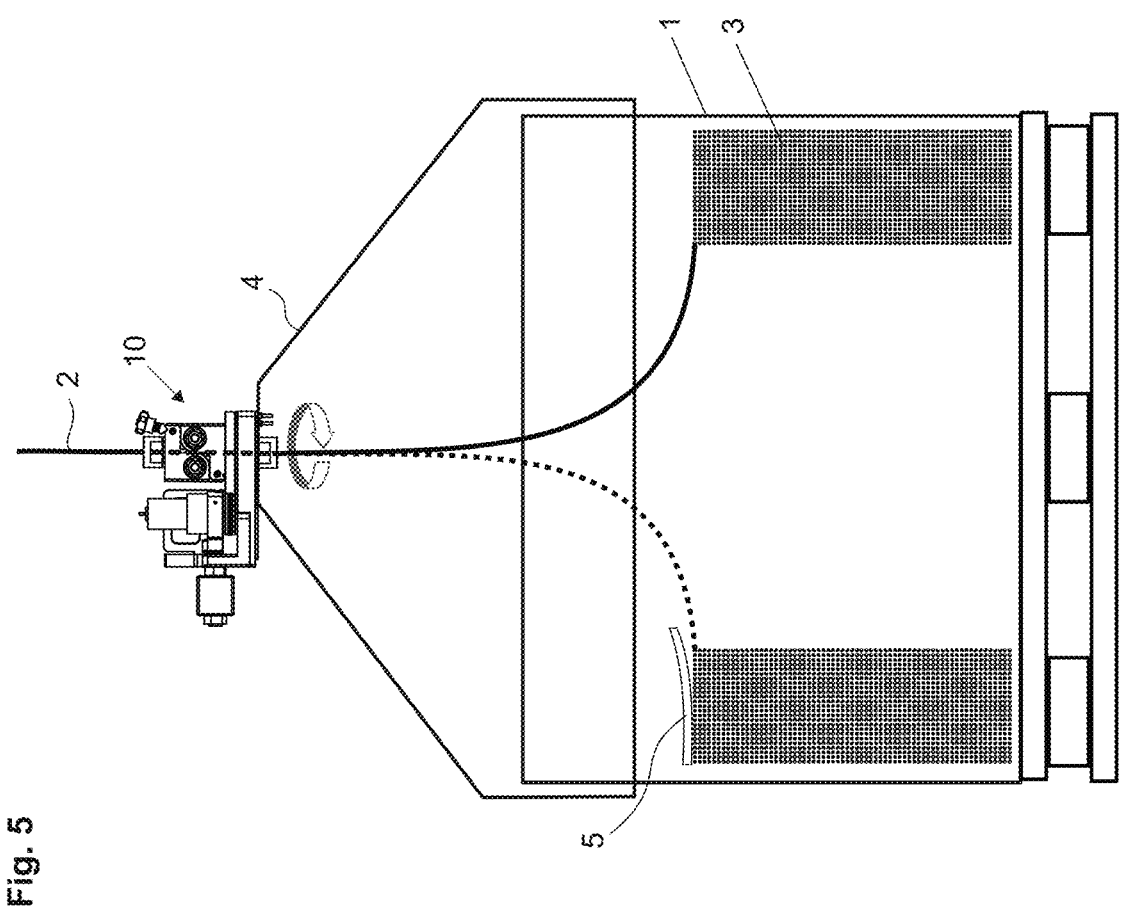
FIG. 5 shows a container provided with a device for imparting a torsional force onto the wire according to the invention.

Device 10 is arranged close to container 1. In the embodiment shown, device 10 is placed on dome 4 (please see in particular FIG. 5).

Figure 6:
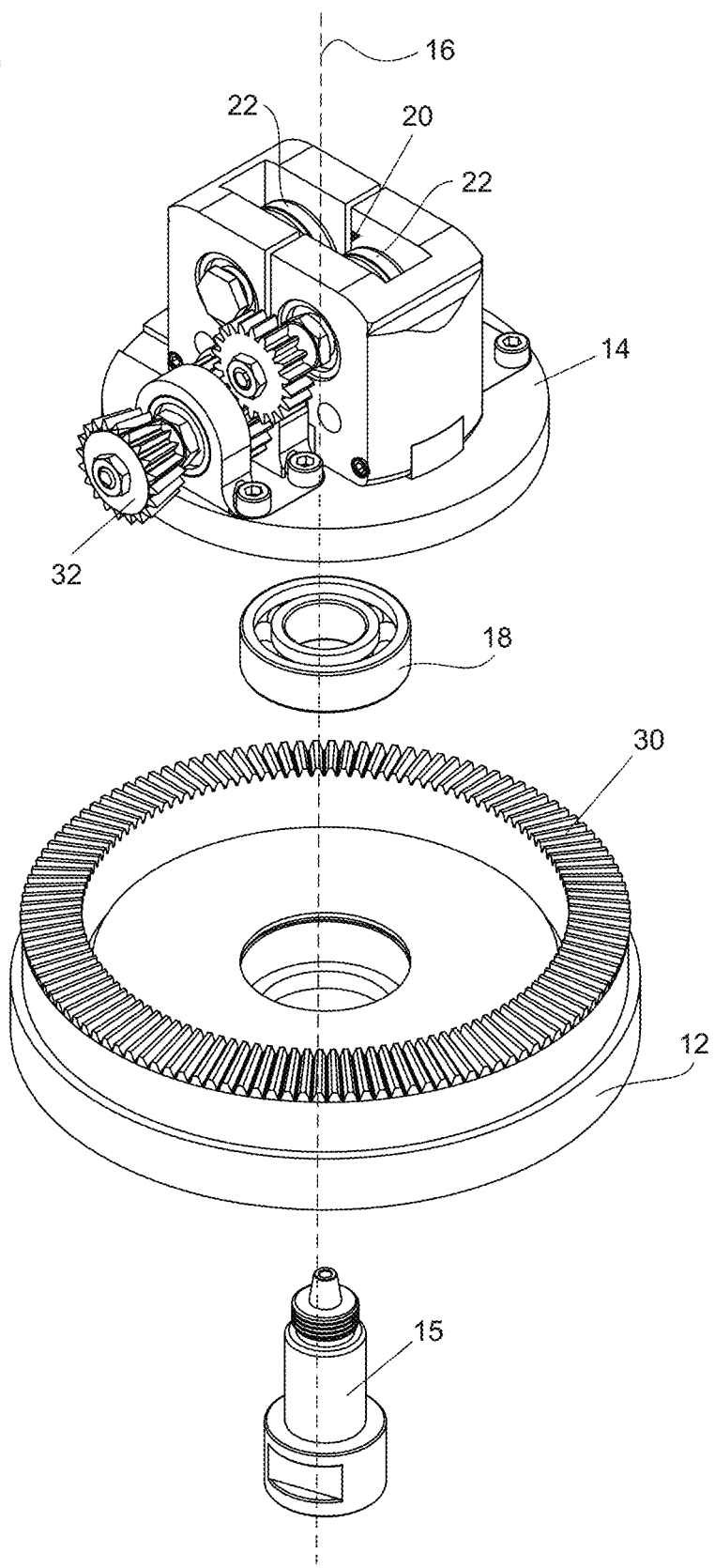
FIG. 6 shows a first embodiment of the device for imparting a torsional force onto a wire in an exploded view.
Figure 7:
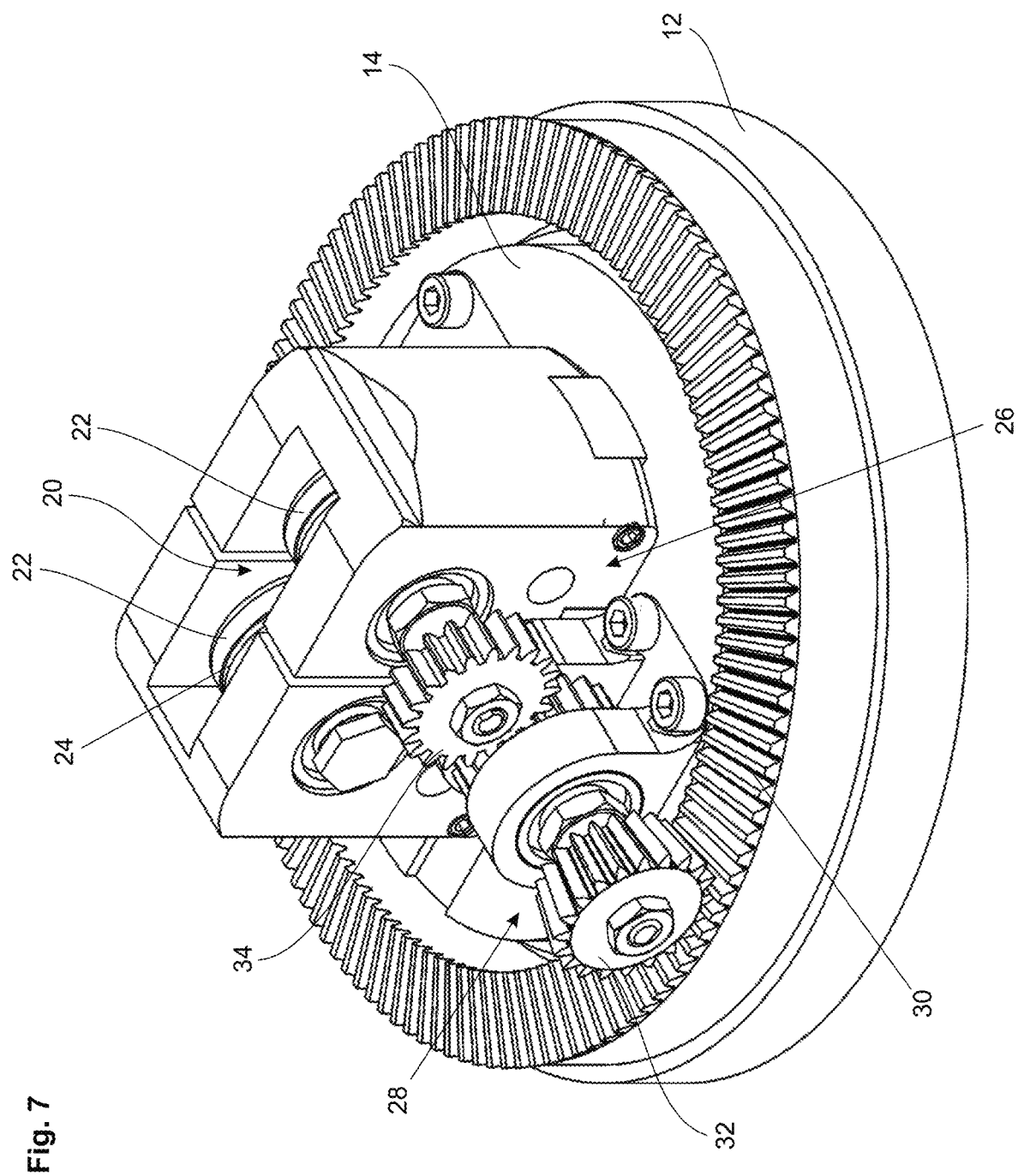
FIG. 7 shows a perspective view of the device shown in FIG. 6.
Figure 8:
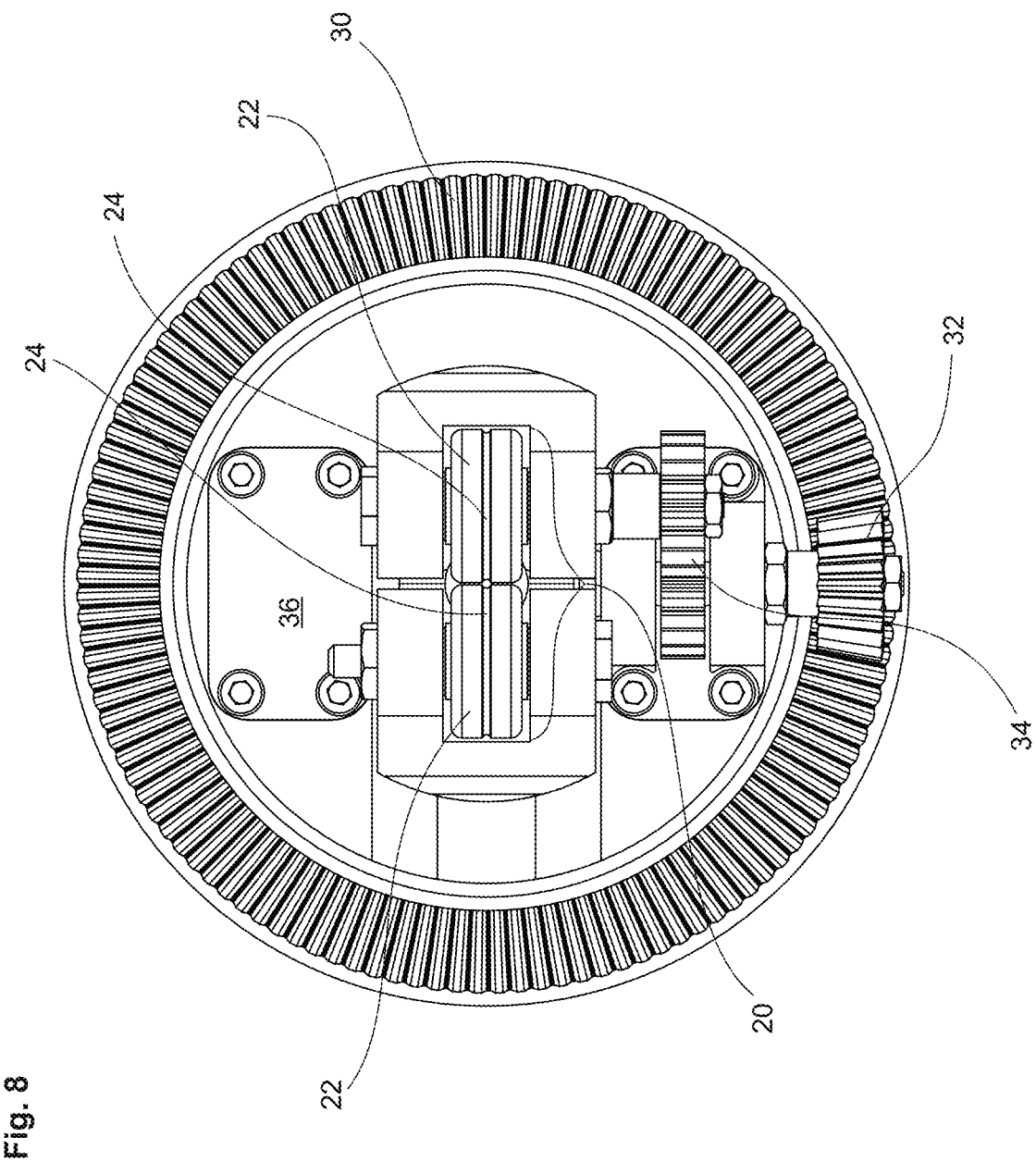
FIG. 8 shows a top view of the device of FIG. 6.
Figure 9:
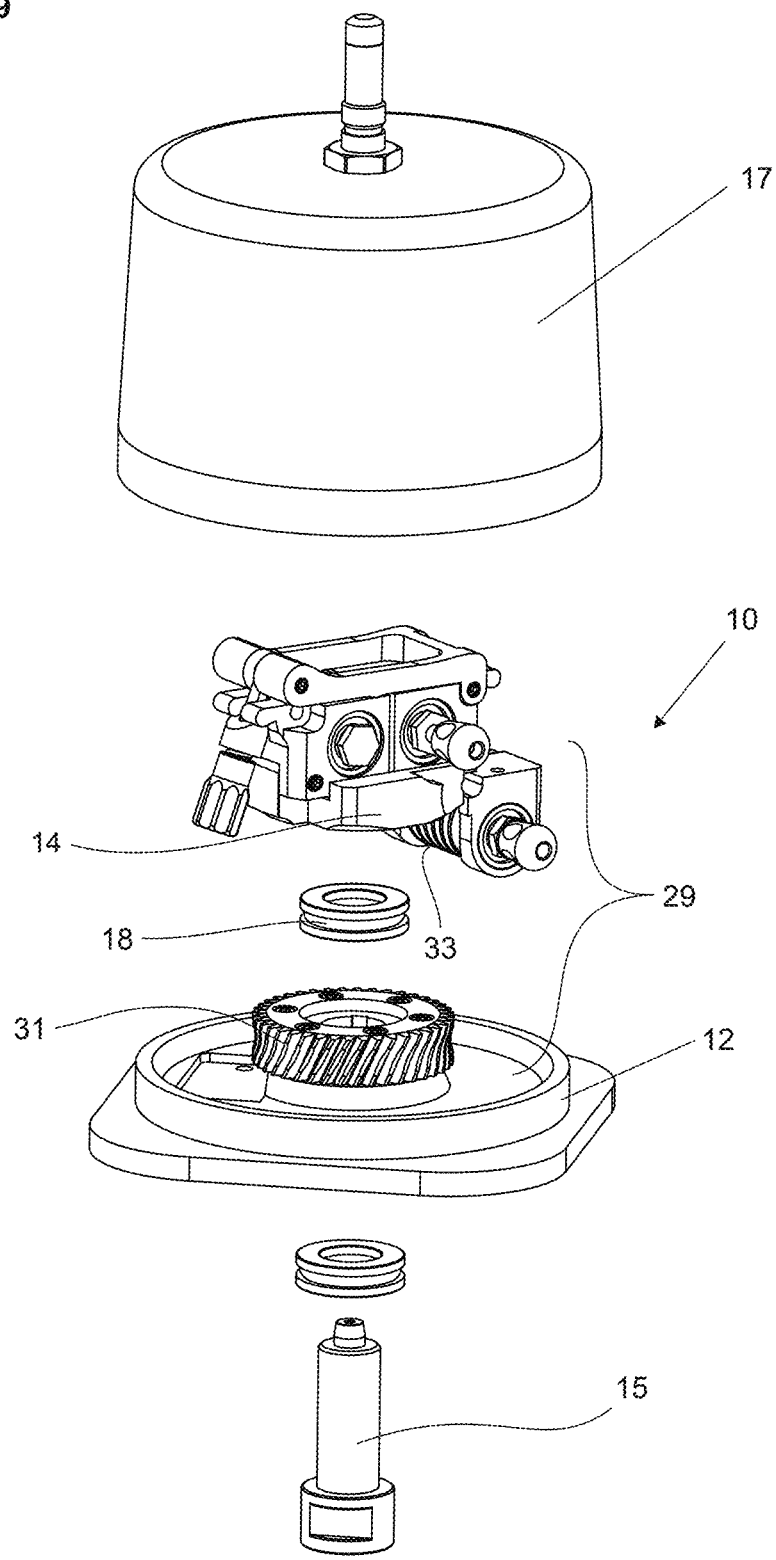
FIG. 9 shows a second embodiment of the device for imparting a torsional force onto a wire in an exploded view.
Figure 10:
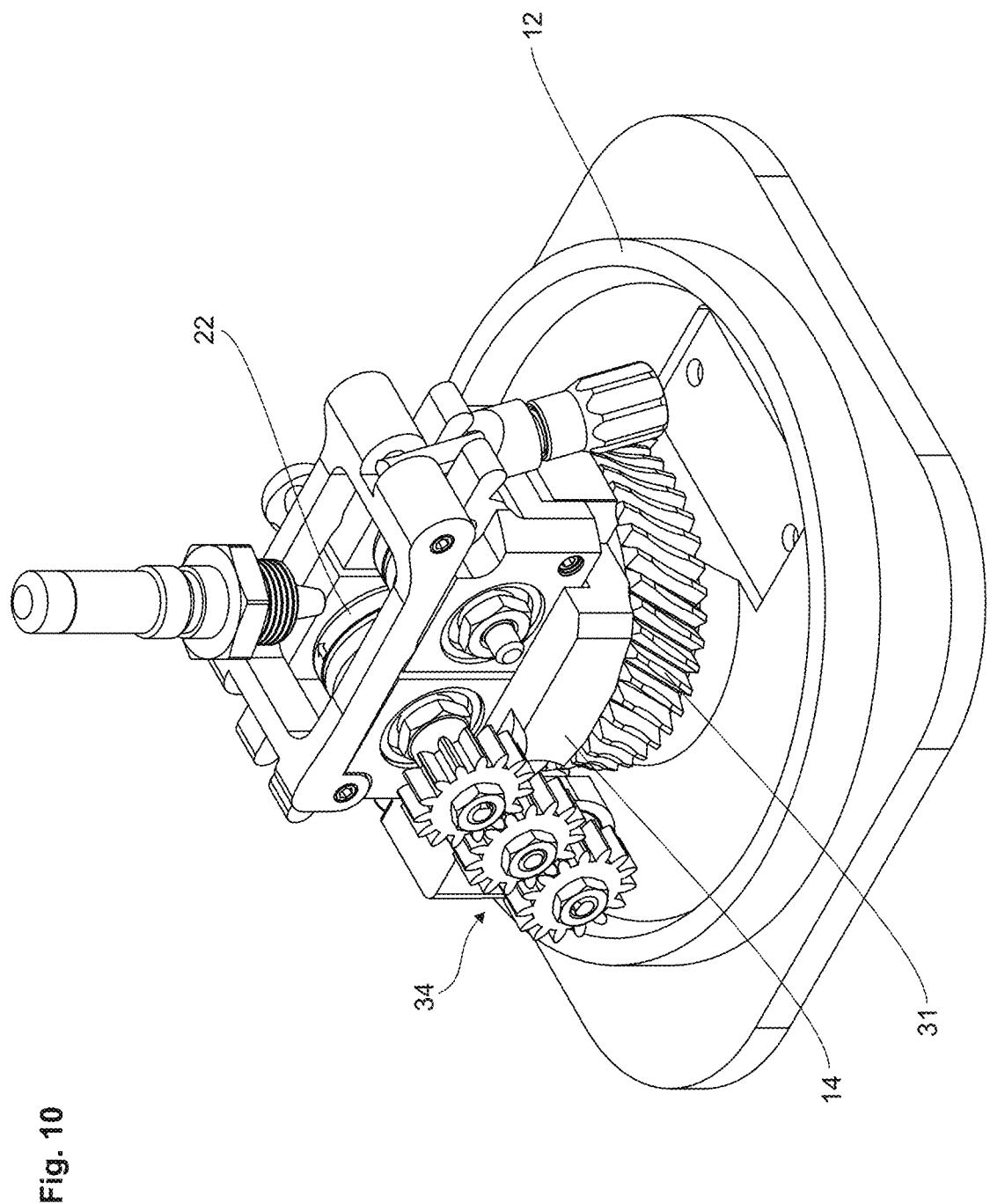
FIG. 10 shows the device of FIG. 9 in a perspective view.
Figure 11:
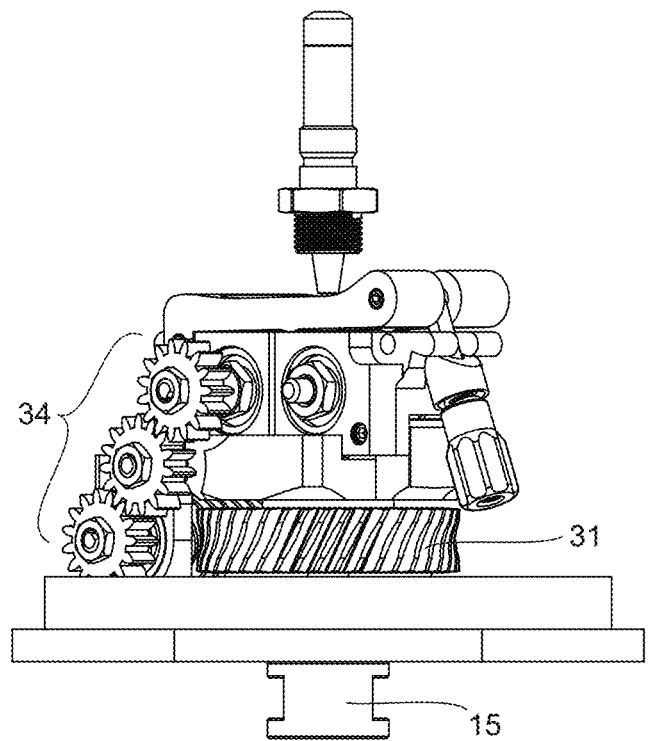
FIG. 11 shows the device of FIG. 9 in a side view, FIG. 12 shown the device of FIG. 9 in a top view, FIGS. 13a) through f) show different gear drives.
Figure 12:
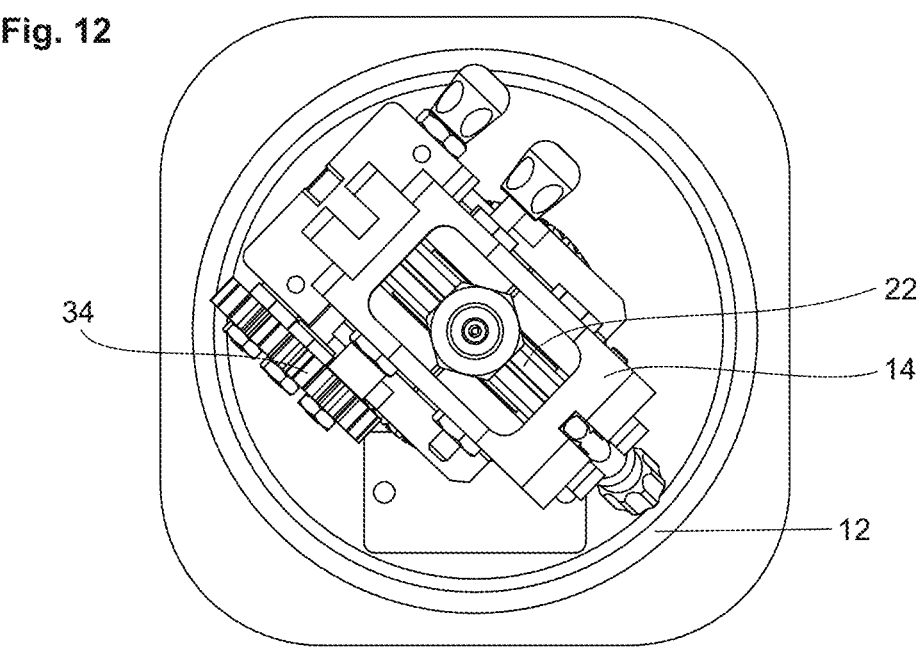

In FIGS. 6 to 8, a first embodiment of device 10 for imparting a torsional force onto the wire will be explained.

Device 10 comprises a base 12 and a support 14. Support 14 is mounted so as to be rotatable with respect to base 12 around an axis 16 which coincides with a wire path along which wire 2 is guided through device 10. A wire inlet guide 15 is attached to support 14.

A roller bearing 18 is used for mounting support 14 on base 12.

A wire clutching device 20 is mounted on support 14. It here consists of two rolls 22 arranged on opposite sides of wire path 16, with both rolls 22 each having a wire reception groove 24.

Wire reception grooves 24 have a width and depth adapted to the dimension of the particular wire so as to tightly engage the wire. When wire feeder 6 withdraws the wire from the container, the wire passes through the wire pass 16 between the two adjacent rolls 22, with rolls 22 being entrained or rotated by the wire.

Device 10 further comprises a rotation mechanism 26 which is adapted for rotating the support with respect to the base. Rotation mechanism 26 is here formed from a gear, in particular a bevel gear 28, which comprises a ring gear 30 fixedly provided on base 12, and a pinion 32 which is mounted on support 14.

Pinion 32 is connected via a gear drive 34 to one of rolls 22. Thus, when the rolls 22 are entrained by the wire, rotation of the rolls is transmitted via the gears to pinion 32, which engages into ring gear 30. Accordingly, support 14 is rotated with respect to base 12 when the wire is drawn through device 10.

As rolls 22 tightly engage the wire, rotation of support 14 and accordingly of wire clutching device 22 imparts a torsional force onto the wire.

The amount of torsional force to be applied onto the wire largely depends from characteristics of the wire. For some wires, it has been found out that applying 1.5 revolutions of wire clutching device 20 per loop of withdrawn wire provides good results. The ratio of revolutions per length of withdrawn wire can be adapted by selecting the size of rolls 22 and the transmission ratio of rotation mechanism 26.

It has been found out that wire clutching device 20 should rotate in the same direction in which the withdrawn wire rotates within container 1. As an example, when looking into container 1 from the top and the wire is withdrawn in a clockwise direction, wire clutching device 20 should also rotate in a clockwise direction.

In order to be able to adapt device 10 to both possible winding directions of the coil in container 1, two amounting positions for pinion 32 are possible. As can be seen in FIG. 8, a mounting position 36 is provided for mounting pinion 32 on the opposite side, thereby changing the direction of rotation.

In order to prevent excessive torsional force from being applied to the wire, a torque limiter can be provided somewhere in the rotation mechanism 20. The torque limiter could be formed by spring-loaded friction disks or a similar mechanism.

A second embodiment of device 10 is shown in FIGS. 9 to 12. For the components known from the first embodiment, the same reference numerals are being used, and reference is made to the above comments.

The general difference between the first and the second embodiment is that in the second embodiment, the rotation mechanism 26 comprises a worm drive 29, formed from a worm gear 31 fixedly provided on base 12, and a screw gear 33 mounted on support 14.

Screw gear 33 is connected via gear drive 34 to one of rolls 22. Thus, when the rolls 22 are entrained by the wire, rotation of the rolls is transmitted via the gears to screw gear 33 which engages into worm gear 31 and, when being rotated, rotates support 14 with respect to base 12.

In a manner similar to the first embodiment, the sense of rotation can be reversed by mounting gear drive 34 on the opposite side of support 14.

It is also possible to exchange gear drive 34 by an electric motor so as to be able to rotate support 14 with respect to base 12 independent from a fixed transmission ratio of wire pay out vs. rotation of the support.

Figure 13:
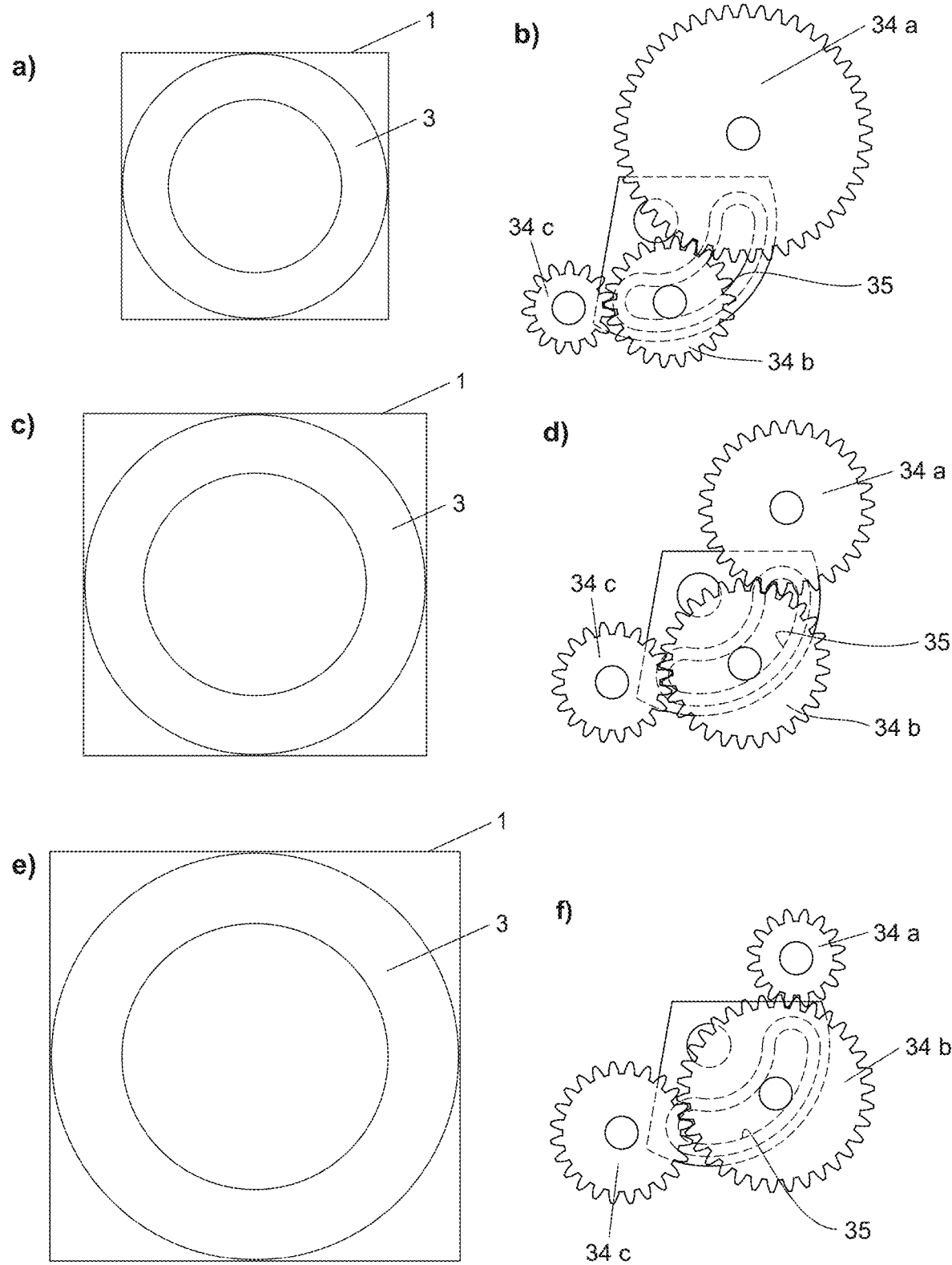

The second embodiment allows to conveniently change the transmission ratio from rolls 22 to screw gear 33, as will be explained in the following with reference to FIG. 13.

In FIG. 13a, a small diameter container 1 with a small diameter coil 3 is shown. For converting the rotation of rolls 22 into a suitable rotation of screw gear 33, a large gear wheel 34a (please see FIG. 13b) is mounted on the axis on which roll 22 is mounted, with gear wheel 34a driving via an intermediate gear 34b a small gear wheel 34c drivingly connected to screw gear 33.

In FIG. 13c, a medium diameter container 1 with a medium diameter coil 3 is shown. For converting the rotation of rolls 22 into a smaller rotation of screw gear 33 (per length unit of withdrawn wire), a medium gear wheel 34a (please see FIG. 13d) is mounted on the axis on which roll 22 is mounted, with gear wheel 34*a* driving via an intermediate gear 34*b* a medium gear wheel 34*c* drivingly connected to screw gear 33.

In FIG. 13*e*, a large diameter container 1 with a large diameter coil 3 is shown. For converting the rotation of rolls 22 into an even smaller rotation of screw gear 33, a small gear wheel 34*a* (please see FIG. 13*f*) is mounted on the axis on which roll 22 is mounted, with gear wheel 34*a* driving via an intermediate gear 34*b* a large gear wheel 34*c* drivingly connected to screw gear 33.

Intermediate gear 34*b* is mounted in a sliding guide 35 which allows to quickly adapt the gear ratio to different pack dimensions (and the corresponding loop diameter inside the pack).

A dust cover 17 closes device 10 so as to prevent dust and dirt from entering into device 10 and container 1.

Figure 14:
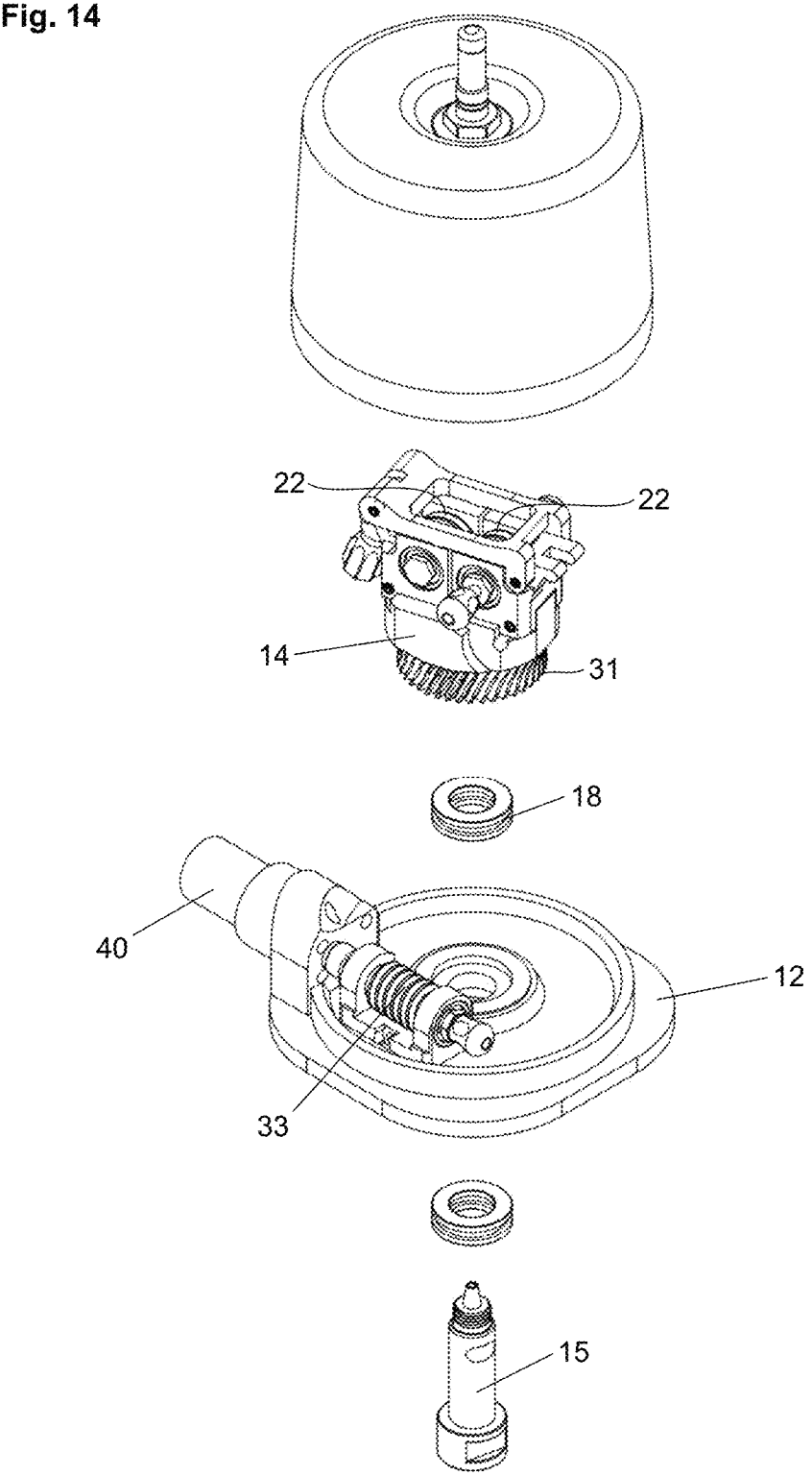
FIG. 14 shows a third embodiment of the device for imparting a torsional force onto a wire in an exploded view.
Figure 15:
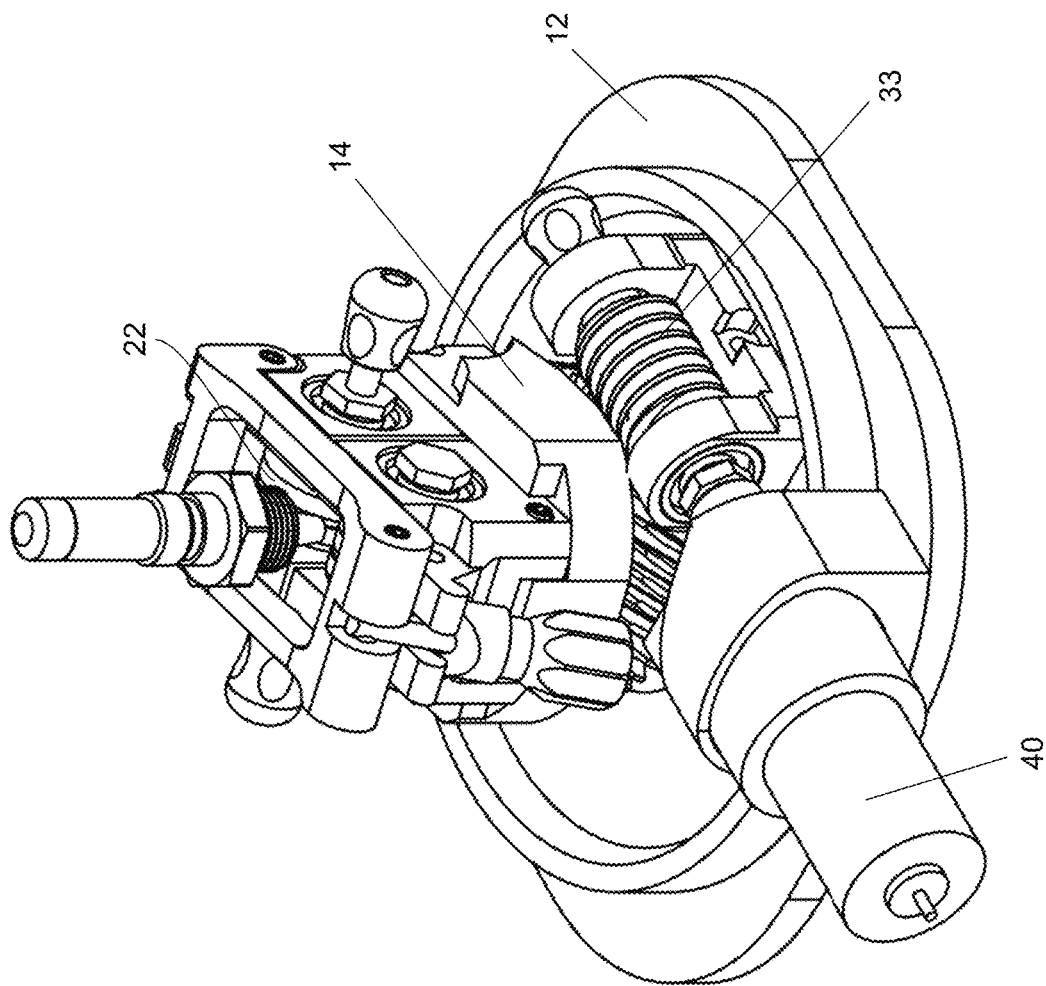
FIG. 15 shows the device of FIG. 14 in a perspective view.
Figure 16:
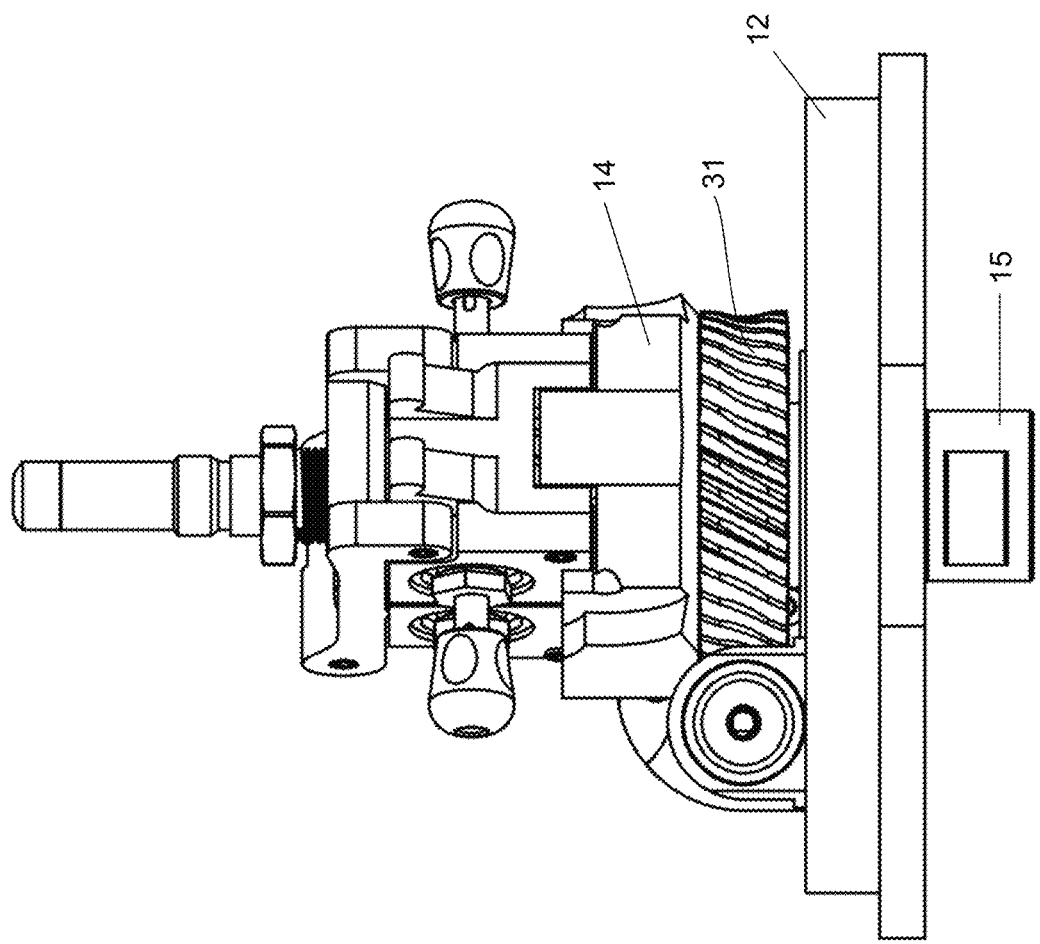
FIG. 16 shows the device of FIG. 14 in a side view, FIG. 17 shown the device of FIG. 14 in a top view.
Figure 17:
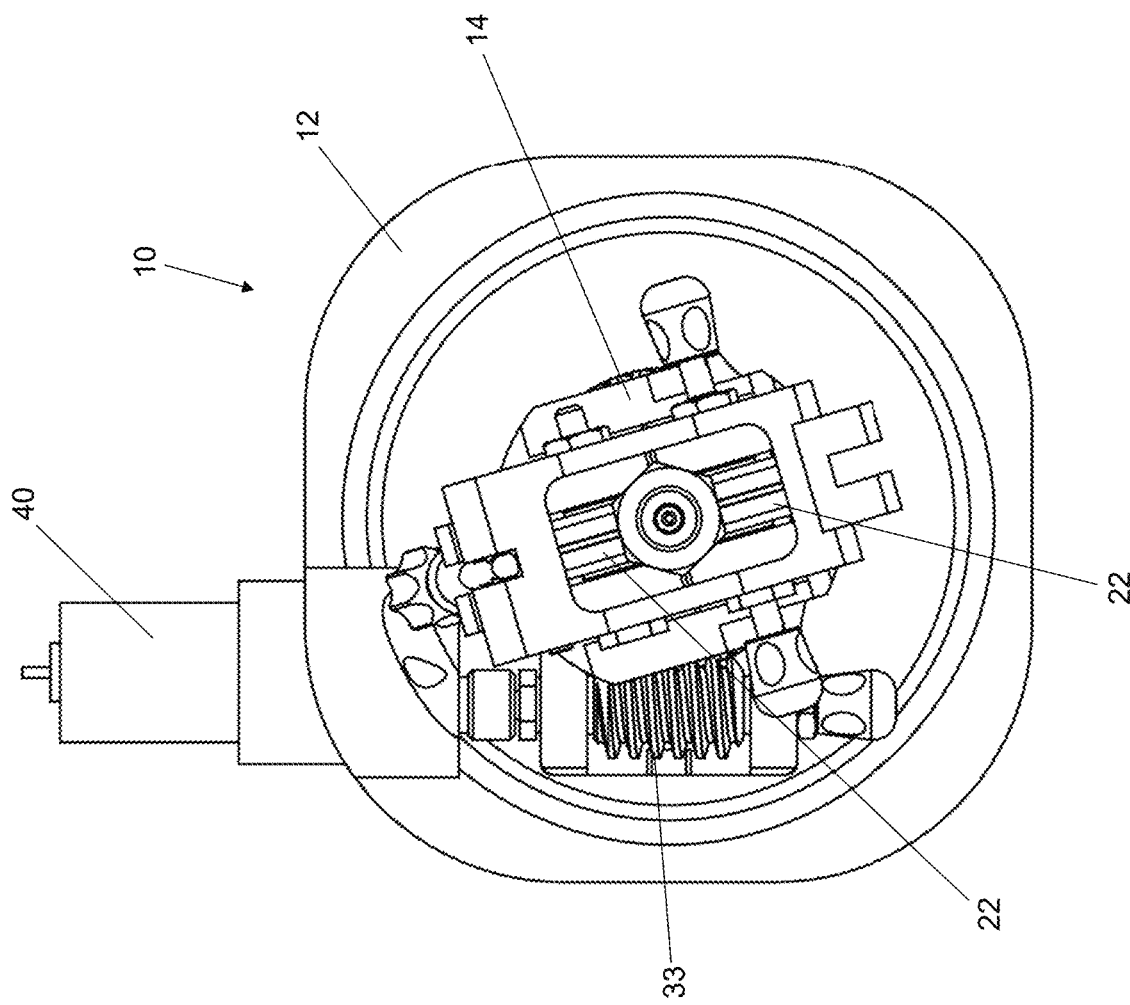
Figure 18:
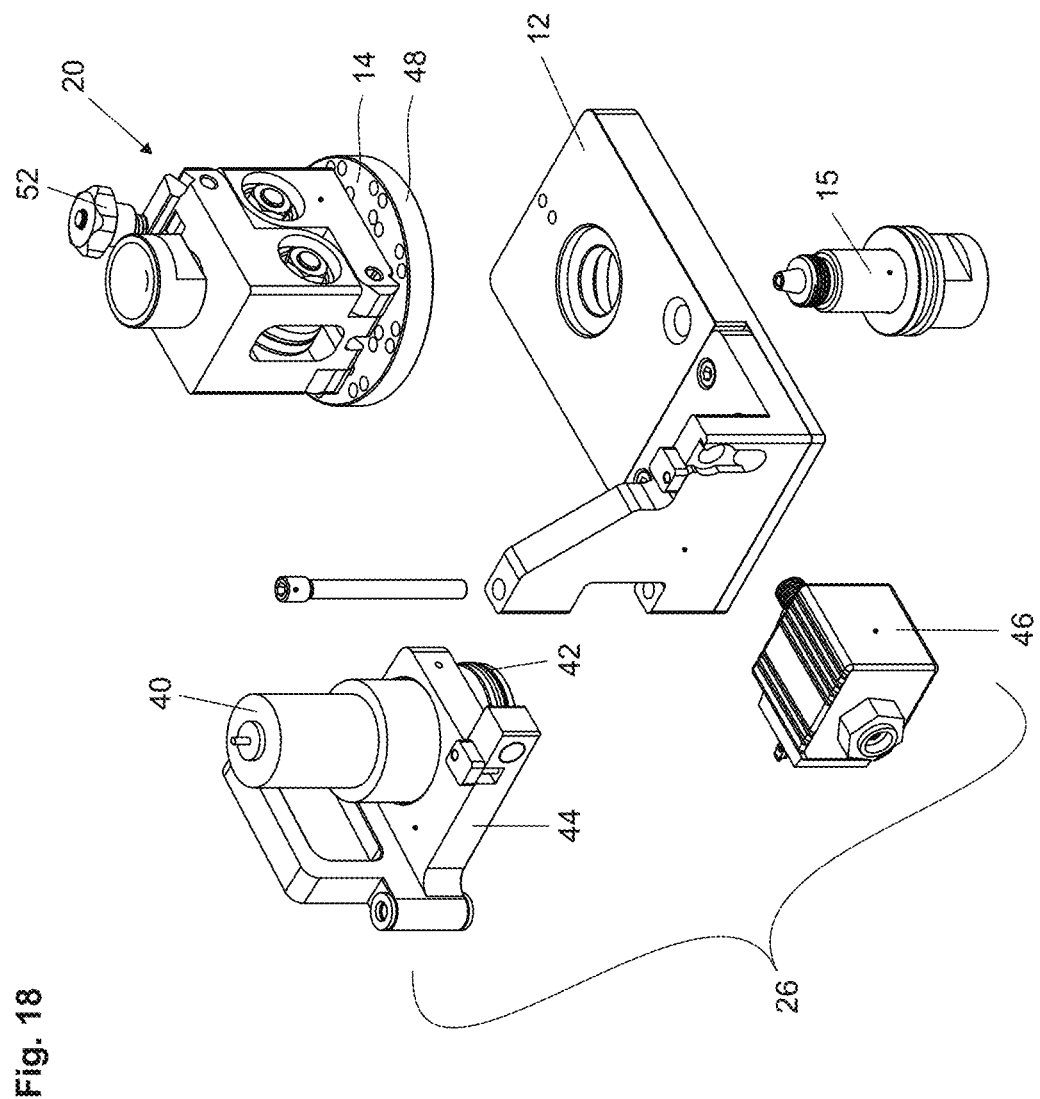
FIG. 18 shows a fourth embodiment of the device for imparting a torsional force onto a wire in an exploded view.
Figure 19:
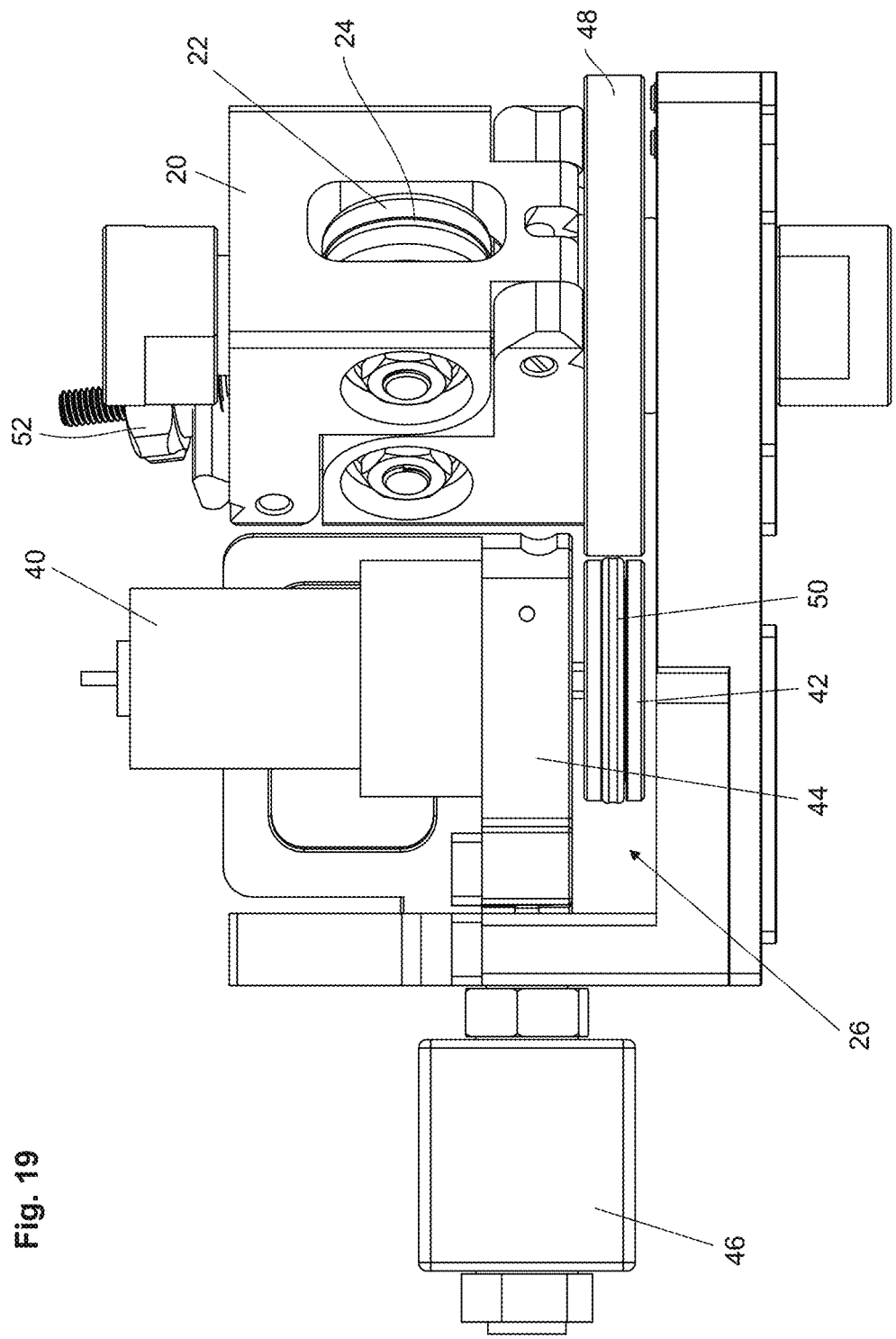
FIG. 19 shows a side view of the device of FIG. 18.
Figure 20:
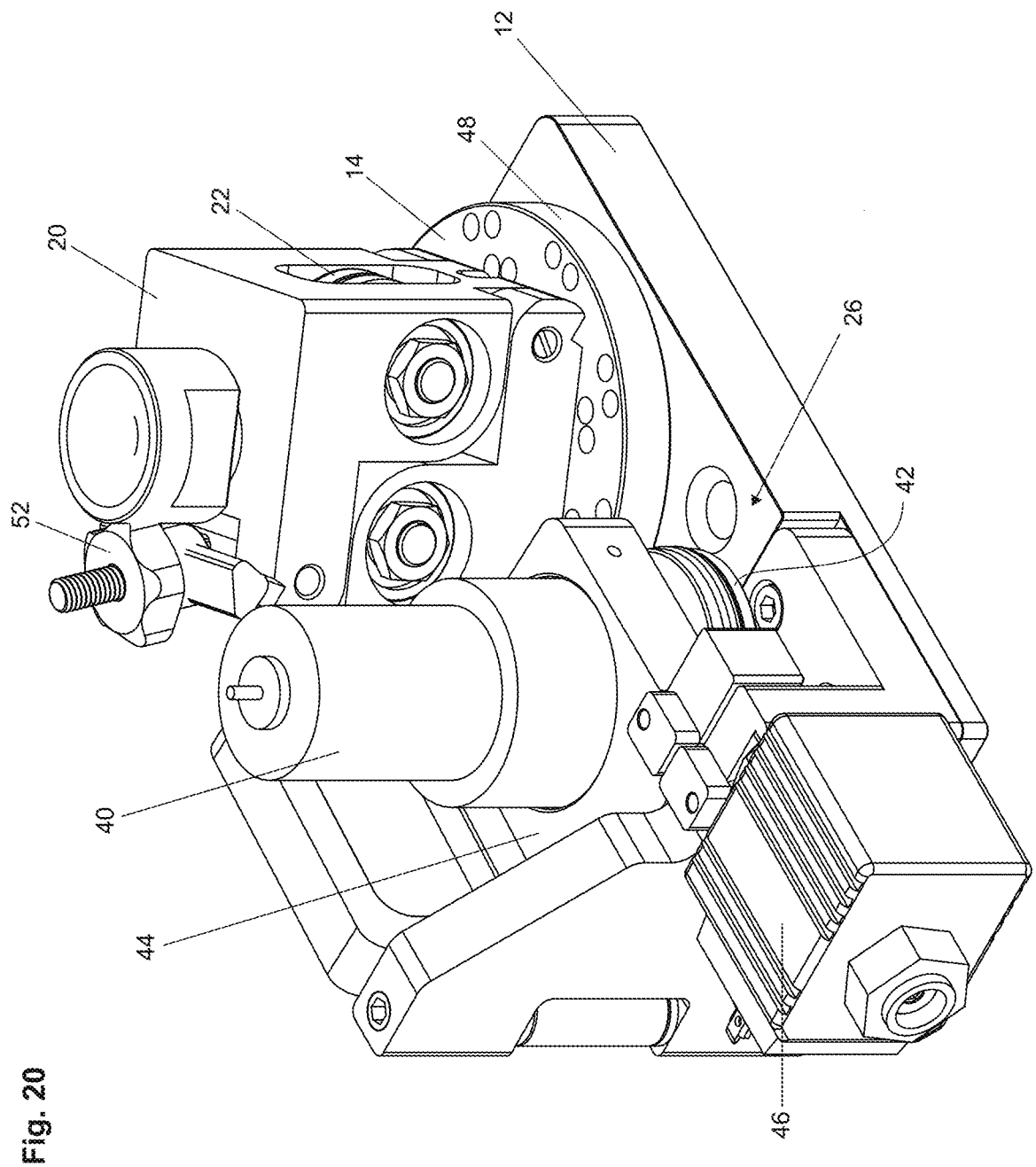
FIG. 20 shows a perspective view of the device of FIG. 18.

A third embodiment of device 10 is shown in FIGS. 14 to 16. For the components known from the first and second embodiments, the same reference numerals are being used, and reference is made to the above comments.

The general difference between the first and second embodiments and the third embodiment is that the first and second embodiments are "passive" devices in which the torsional force applied onto the wire is generated by the movement of the wire itself while in the second embodiment, the torsional force is actively generated by a motor.

The third embodiment also uses a worm drive 29 formed from a worm gear 31 and a screw gear 33. Here, worm gear 31 is fixedly connected to support 14 while screw gear 33 is mounted on base 12.

A motor 40 is provided for driving (via a suitable reduction gear) screw gear worm 33.

Rolls 22 are mounted on support 14 so as to be rotatable. They are biased with an adjustable force against each other.

In the third embodiment, device 10 is controlled by a control which can be incorporated into wire feeder 6. It is also possible to implement the control separately.

When wire is withdrawn from container 1, electric motor 40 is operated so as to rotate wire clutching device 20 in the correct direction, thereby exerting a torsional force onto the wire.

The amount of rotation of wire clutching device 20 per length unit of withdrawn wire can very conveniently be controlled via the control. In order to prevent that excessive torsional forces are exerted onto the wire, the motor current of motor 40 can be controlled. Should excessive torsional forces are being built up in the wire, the motor current increases as a higher force is required to rotate the wire. In such event, the speed of operation of motor 40 can be reduced or stopped, or it is possible to deactivate biasing device 46 so that support 14 can freely rotate, thereby releasing the torsional tension in the wire. Subsequently, biasing device 46 can be reactivated, and operation of motor 40 can be resumed.

The advantage of the third embodiment is that many of its components can be used both for a passive device as per the second embodiment and for the active device as per the third embodiment.

A fourth embodiment of device 10 is shown in FIGS. 17 to 20. For the components known from the previous embodiments, the same reference numerals are being used, and reference is made to the above comments.

The general difference between the third embodiment and the fourth embodiment is that in the fourth embodiment, there is no intermeshing gear connection between the motor and the support (thus a positive connection) but a friction-based connection.

Rotating mechanism 26 here comprises a drive motor 40 (an electric motor) which drives a drive wheel 42. Electric motor 40 together with drive wheel 42 are mounted on a carrier 44 which is pivotably connected to base 12.

An application device 46 which is here in the form of a solenoid, is mounted on base 12 and is adapted for urging carrier 44 together with motor 40 and drive wheel 42 in a direction towards support 14. More specifically, application device 46 presses drive wheel 42 against a cylindrical driven surface 48 of support 14.

Drive wheel 42 can be provided with an O-ring 50 or some other friction enhancing element in order to ensure that support 14 can be rotated by motor 40.

Wire clutching device 20 of the fourth embodiment basically corresponds to the first embodiment in as it contains two rolls 22 which are urged against each other and against the wire passing through between the rolls. A biasing device 52 is here provided which allows changing the force with which the two rolls are pressed against each other.

When wire is withdrawn from container 1, electric motor 40 is operated so as to rotate wire clutching device 20 in the correct direction, thereby exerting the desired torsional force onto the wire. At the same time, biasing device 46 is activated so as to ensure that the power of motor 40 is transmitted to support 14.

Figure 21:
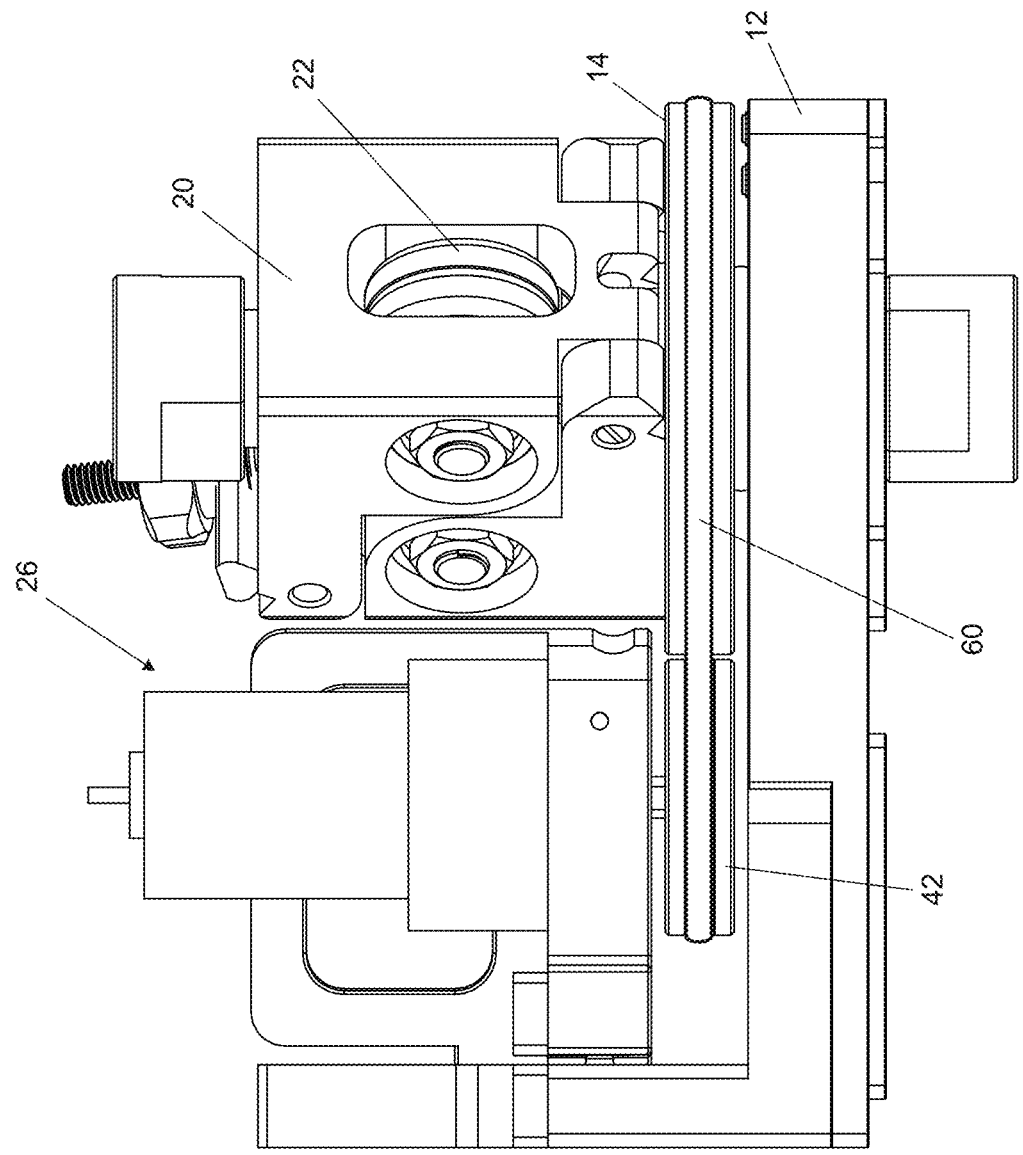
FIG. 21 shows a side view of an alternative of the device of FIG. 18.

In FIG. 21, an alternative to the embodiment of FIGS. 17 to 20 is shown. Here, drive wheel 42 is connected to support 14 via a belt or rubber ring 60, thereby avoiding the need for a biasing device.

The invention claimed is:

1. A device for imparting a torsional force onto a wire, having a base, a support mounted so as to be rotatable with respect to the base around an axis of rotation, the axis of rotation coinciding with a wire path extending through the base and the support, a wire clutching device mounted on the support and adapted to engage at a wire guided along the wire path, and a rotation mechanism which is adapted for rotating the support with respect to the base.

2. The device of claim 1 wherein the wire clutching device is a pair of rolls which are mounted on the support, the rolls being arranged on opposite sides of the wire path, at least one of the rolls having a wire reception groove.

3. The device of claim 2 wherein a biasing device is provided for biasing the two rolls against each other.

4. The device of claim 1 wherein the rotation mechanism comprises a gear adapted for converting a movement of the wire along the wire path into a rotation of the support with respect to the base.

5. The device of claim 4 wherein the gear is a bevel gear with a ring gear connected to the base and a pinion mounted rotatably on the support.

6. The device of claim 5 wherein two mounting positions for the pinion are provided on the support.

7. The device of claim 6 wherein a motor current sensor is provided.

8. The device of claim 4 wherein the gear is a worm drive.

9. The device of claim 4 wherein an intermediate gear wheel is provided which is mounted in a sliding guide.

10. The device of claim 4 wherein a torque limiter is associated with the rotation mechanism.

11. The device of claim 1 wherein the rotation mechanism comprises a drive motor mounted on the base and adapted for rotating the support with respect to the base.

12. The device of claim 11 wherein a coupling device is provided for connecting the motor to the support.

13. The device of claim 12 wherein the coupling comprises an application device for urging a drive wheel connected to the drive motor, against a driven surface associated with the support.

14. A system with a container in which an amount of wire is contained in the form of a coil consisting of a plurality of loops of wire, a device for imparting a torsional force onto a wire, the device being mounted above the wire, the device having a base, a support mounted so as to be rotatable with respect to the base around an axis of rotation, the axis of rotation coinciding with a wire path extending through the base and the support, a pair of rolls which are mounted on the support, the rolls being arranged on opposite sides of the wire path, at least one of the rolls having a wire reception groove, and a rotation mechanism which is adapted for rotating the support with respect to the base, the system further comprising at least one wire feeder which is arranged downstream of the device for imparting a torsional force onto the wire.

15. The system of claim 14 wherein a retainer is arranged on the coil of wire.

16. The system of claim 15 wherein the wire feeder arranged downstream of the device for imparting a rotation onto the wire is an auxiliary wire feeder, and wherein a main wire feeder is provided downstream of the auxiliary wire feeder.

17. A system with a container in which an amount of wire is contained in the form of a coil consisting of a plurality of loops of wire, a device for imparting a torsional force onto a wire, the device being mounted above the wire, the device having a base, a support mounted so as to be rotatable with respect to the base around an axis of rotation, the axis of rotation coinciding with a wire path extending through the base and the support, a pair of rolls which are mounted on the support, the rolls being arranged on opposite sides of the wire path, at least one of the rolls having a wire reception groove, and a rotation mechanism which is adapted for rotating the support with respect to the base, the rotation mechanism comprising a drive motor for rotating the support with respect to the base, the system further comprising at least one wire feeder which is arranged downstream of the device for imparting a torsional force onto the wire, and a control for controlling the speed of rotation of the drive motor of the rotation mechanism, the control comprising a torque detection for limiting the torsional force applied on the wire.

18. The system of claim 17 wherein the wire is a welding wire from an aluminum alloy comprising magnesium.

* * * * *